(12) United States Patent
Hilerio et al.

(10) Patent No.: US 8,434,135 B2
(45) Date of Patent: Apr. 30, 2013

(54) CREATING AND LAUNCHING A WEB APPLICATION WITH CREDENTIALS

(75) Inventors: Israel Hilerio, Kenmore, WA (US);
Justin Martin Posey, Redmond, WA (US); Carlos Yeung, Seattle, WA (US); Alexander H. Malek, Seattle, WA (US); Bruce A. Morgan, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 295 days.

(21) Appl. No.: 12/814,376

(22) Filed: Jun. 11, 2010

(65) Prior Publication Data

US 2011/0307946 A1 Dec. 15, 2011

(51) Int. Cl.
*H04L 9/32* (2006.01)
*G06F 21/00* (2006.01)

(52) U.S. Cl.
USPC ............................. 726/7; 709/229

(58) Field of Classification Search ....... 726/7; 709/229
See application file for complete search history.

(56) References Cited

U.S. PATENT DOCUMENTS

| | | | |
|---|---|---|---|
| 5,956,483 A | 9/1999 | Grate et al. | |
| 6,002,402 A | 12/1999 | Schacher | |
| 6,233,591 B1 | 5/2001 | Sherman et al. | |
| 6,278,448 B1 | 8/2001 | Brown et al. | |
| 6,636,889 B1 | 10/2003 | Estrada et al. | |
| 6,742,026 B1 | 5/2004 | Kraenzel et al. | |
| 6,842,779 B1 | 1/2005 | Nishizawa | |
| 6,928,620 B1 | 8/2005 | Crangle et al. | |
| 7,143,347 B2 | 11/2006 | Su | |
| 7,155,681 B2 | 12/2006 | Mansour et al. | |
| 7,181,438 B1 | 2/2007 | Szabo | |
| 7,203,948 B2 | 4/2007 | Mukundan et al. | |
| 7,243,369 B2 | 7/2007 | Bhat et al. | |
| 7,328,269 B1 | 2/2008 | Danner et al. | |
| 7,383,320 B1 | 6/2008 | Silberstein et al. | |
| 7,440,997 B2 | 10/2008 | Colling et al. | |
| 7,467,402 B2 | 12/2008 | Pennington et al. | |
| 7,509,374 B2 | 3/2009 | Trinh et al. | |
| 7,526,559 B1 * | 4/2009 | Phillips ........................ | 709/227 |

(Continued)

FOREIGN PATENT DOCUMENTS

| KR | 20070028014 | 3/2007 |
|---|---|---|
| KR | 20080089851 | 10/2008 |

(Continued)

OTHER PUBLICATIONS

"International Search Report", Mailed Date: Feb. 9, 2012, Application No. PCT/US2011/038507, Filed Date: May 31, 2011, pp. 9.

(Continued)

*Primary Examiner* — Kambiz Zand
*Assistant Examiner* — Aubrey Wyszynski
(74) *Attorney, Agent, or Firm* — Wolfe-SBMC

(57) ABSTRACT

Various embodiments provide a mechanism to allow end users to install web applications and websites onto their desktop. In accordance with one or more embodiments, client-side code can be utilized to allow developers associated with a website to define boundaries associated with user interaction, and have those boundaries enforced by a run-time engine. In at least some embodiments, developers can provide, through JavaScript code and/or HTML markup, various configurations for the creation of a start menu shortcut, navigation, and so-called jumplist integration.

20 Claims, 38 Drawing Sheets

U.S. PATENT DOCUMENTS

| | | | |
|---|---|---|---|
| 7,540,020 B1 | 5/2009 | Biswas et al. | |
| 7,555,713 B2 | 6/2009 | Yang | |
| 7,562,254 B2 | 7/2009 | Davis et al. | |
| 7,680,908 B2 | 3/2010 | Gates, III et al. | |
| 7,716,280 B2 | 5/2010 | Meijer et al. | |
| 8,041,763 B2 | 10/2011 | Kordun et al. | |
| 8,051,143 B2 | 11/2011 | Pallamreddy et al. | |
| 8,069,223 B2 | 11/2011 | Marmaros | |
| 2001/0000668 A1 | 5/2001 | Bodnar | |
| 2002/0049975 A1 | 4/2002 | Thomas et al. | |
| 2002/0059227 A1 | 5/2002 | Narahara | |
| 2002/0111995 A1 | 8/2002 | Mansour et al. | |
| 2002/0129096 A1 | 9/2002 | Mansour et al. | |
| 2002/0152228 A1 | 10/2002 | Lopez et al. | |
| 2003/0164855 A1 | 9/2003 | Grant et al. | |
| 2003/0225750 A1 | 12/2003 | Farahat et al. | |
| 2004/0054661 A1 | 3/2004 | Cheung et al. | |
| 2004/0100501 A1* | 5/2004 | Dornback | 345/769 |
| 2004/0143651 A1 | 7/2004 | Allen et al. | |
| 2004/0193699 A1 | 9/2004 | Heymann et al. | |
| 2004/0201630 A1 | 10/2004 | McInerney | |
| 2004/0216034 A1 | 10/2004 | Lection et al. | |
| 2005/0010647 A1 | 1/2005 | Durham | |
| 2005/0015643 A1 | 1/2005 | Davis et al. | |
| 2005/0120305 A1 | 6/2005 | Engstrom et al. | |
| 2005/0149952 A1 | 7/2005 | Goodwin et al. | |
| 2005/0188174 A1 | 8/2005 | Guzak et al. | |
| 2005/0278726 A1 | 12/2005 | Cano et al. | |
| 2006/0031289 A1 | 2/2006 | Experton | |
| 2006/0031849 A1 | 2/2006 | Barta et al. | |
| 2006/0048214 A1 | 3/2006 | Pennington et al. | |
| 2006/0075088 A1 | 4/2006 | Guo et al. | |
| 2006/0106680 A1 | 5/2006 | Shafron et al. | |
| 2006/0112079 A1 | 5/2006 | Holt et al. | |
| 2006/0130004 A1 | 6/2006 | Hughes et al. | |
| 2006/0156330 A1 | 7/2006 | Chiu | |
| 2006/0206834 A1 | 9/2006 | Fisher et al. | |
| 2006/0218500 A1 | 9/2006 | Sauve et al. | |
| 2007/0033517 A1 | 2/2007 | O'Shaughnessy et al. | |
| 2007/0050710 A1 | 3/2007 | Redekop | |
| 2007/0233880 A1 | 10/2007 | Nieh et al. | |
| 2007/0240215 A1 | 10/2007 | Flores et al. | |
| 2007/0255815 A1* | 11/2007 | Justice et al. | 709/223 |
| 2007/0299938 A1 | 12/2007 | Chandra | |
| 2008/0016461 A1 | 1/2008 | Hoblit | |
| 2008/0046969 A1 | 2/2008 | Reiher et al. | |
| 2008/0052369 A1 | 2/2008 | Weber et al. | |
| 2008/0077936 A1 | 3/2008 | Goel et al. | |
| 2008/0082641 A1 | 4/2008 | Meijer et al. | |
| 2008/0082652 A1 | 4/2008 | Gates et al. | |
| 2008/0120569 A1 | 5/2008 | Mann et al. | |
| 2008/0133510 A1 | 6/2008 | Timmons | |
| 2008/0148287 A1 | 6/2008 | Regnier et al. | |
| 2008/0201476 A1 | 8/2008 | Ramaswamy et al. | |
| 2008/0215997 A1 | 9/2008 | Wu et al. | |
| 2008/0229333 A1 | 9/2008 | Beck et al. | |
| 2008/0235352 A1 | 9/2008 | Yolleck et al. | |
| 2008/0282255 A1 | 11/2008 | Kawamoto et al. | |
| 2008/0301562 A1 | 12/2008 | Berger et al. | |
| 2009/0019357 A1* | 1/2009 | Cudich et al. | 715/234 |
| 2009/0019534 A1 | 1/2009 | Bakshi et al. | |
| 2009/0049183 A1 | 2/2009 | Thompson et al. | |
| 2009/0063968 A1 | 3/2009 | Wenig et al. | |
| 2009/0125833 A1 | 5/2009 | Abernethy, Jr. et al. | |
| 2009/0158212 A1 | 6/2009 | Dykstra-Erickson et al. | |
| 2009/0199175 A1 | 8/2009 | Keller et al. | |
| 2009/0216724 A1 | 8/2009 | Cai et al. | |
| 2009/0217240 A1 | 8/2009 | Motoyama et al. | |
| 2009/0228805 A1 | 9/2009 | Ruehle | |
| 2009/0259744 A1 | 10/2009 | Kolke et al. | |
| 2009/0265705 A1 | 10/2009 | Wei | |
| 2009/0313640 A1 | 12/2009 | Liang et al. | |
| 2009/0320017 A1* | 12/2009 | Jackson et al. | 717/174 |
| 2009/0328169 A1 | 12/2009 | Hutchison et al. | |
| 2010/0017695 A1 | 1/2010 | Palmieri | |
| 2010/0077347 A1 | 3/2010 | Kirtane et al. | |
| 2010/0115430 A1 | 5/2010 | Skirpa | |
| 2010/0115450 A1 | 5/2010 | Scott et al. | |
| 2011/0145360 A1 | 6/2011 | Sheshagiri et al. | |
| 2011/0219385 A1 | 9/2011 | Jacobson et al. | |
| 2011/0295689 A1* | 12/2011 | Brady | 705/14.54 |
| 2011/0307738 A1 | 12/2011 | Hilerio | |
| 2011/0307794 A1 | 12/2011 | Hilerio | |
| 2011/0307810 A1 | 12/2011 | Hilerio | |
| 2011/0307811 A1 | 12/2011 | Kim | |
| 2011/0307812 A1 | 12/2011 | Hilerio | |
| 2011/0307880 A1 | 12/2011 | Hilerio | |
| 2011/0307883 A1 | 12/2011 | Hilerio | |
| 2012/0010995 A1 | 1/2012 | Skirpa et al. | |

FOREIGN PATENT DOCUMENTS

| | | |
|---|---|---|
| KR | 20090000104 | 1/2009 |
| KR | 1020090067419 A | 6/2009 |
| KR | 20090102252 | 9/2009 |
| KR | 1020100027200 A | 3/2010 |
| KR | 20100059073 | 6/2010 |
| WO | WO-2008002274 | 1/2008 |
| WO | WO-2009027474 | 3/2009 |

OTHER PUBLICATIONS

"Non-Final Office Action", U.S. Appl. No. 12/814,368, (Sep. 9, 2011), 12 pages.

"Web App Tabs", Retrieved from: <http://my.opera.com/IceArdor/blog/2010/04/22/web-app-tabs> on Sep. 2, 2011,(Apr. 22, 2010), 4 pages.

"PCT Search Report and Written Opinion", Application No. PCT/US2011/038386, (Dec. 20, 2011), 9 pages.

"PCT Search Report and Written Opinion", Application No. PCT/US2011/038511, (Dec. 23, 2011), 9 pages.

"PCT Search Report and Written Opinion", Application No. PCT/US2011/038503, (Dec. 23, 2011), 9 pages.

"PCT Search Report and Written Opinion", Application No. PCT/US2011/038505, (Dec. 23, 2011), 9 pages.

"PCT Search Report and Written Opinion", Application No. PCT/US2011/038373, (Dec. 26, 2011), 9 pages.

"PCT Search Report and Written Opinion", Application No. PCT/US2011/038509, (Dec. 27, 2011), 9 pages.

"PCT Search Report and Written Opinion", Application No. PCT/US2011/038368, (Feb. 9, 2012), 11 pages.

Mathews, Lee "Firefox 3.7, now with Windows 7 Jumplist Support", Retrieved from: <http://www.downloadsquad.com/2009/10/05/firefox-3-7-now-with-windows-7-jumplist-support/> on Mar. 17, 2010, (Oct. 5, 2009),5 pages.

"Jumplist Launcher Consolidates Windows 7 Taskbar Launchers", Retrieved from: <http://lifehacker.com/5302409/jumplist-launcher-consolidates-windows-7-taskbar-launchers> on Mar. 17, 2010, (Jun. 25, 2009),1 page.

Koppikar, Hemant et al., "Integration of Smart Client applications with existing Web applications", Retrieved from: <http://www.codeproject.com/KB/smart/SmartDemo.aspx> on Mar. 17, 2010, (Sep. 20, 2005),6 pages.

Martin, "Google Chrome Windows 7 Jumplists", Retrieved from: <http://www.ghacks.net/2009/08/10/google-chrome-windows-7-jumplists/> on Mar. 17, 2010, (Aug. 10, 2009),3 pages.

"Bugzilla:Addons", https://wiki.mozilla.org/Bugzilla:Addons, (Feb. 2, 2007),5 pages.

Arrington, Michael "Bridging Desktop and Web Applications—A Look at Mozilla Prism", Retrieved from: <http://techcrunch.com/2008/03/22/bridging-desktop-and-web-applications-a-look-at-mozilla-prism/> on Mar. 18, 2010, (Mar. 22, 2008),3 pages.

"Turn Web Applications into Desktop Applications with Bubbles", Retrieved from: <http://www.online-tech-tips.com/free-software-downloads/turn-web-applications-into-desktop-applications-with-bubbles/> on Mar. 18, 2010, (Mar. 8, 2008),7 pages.

"Fluid", Retrieved from: <http://fluidapp.com/> on 3/18/10, (Dec. 13, 2007),2 pages.

Denoue, Laurent et al., "WebNC: efficient sharing of web applications", *Proceedings of the 20th ACM Conference on Hypertext and Hypermedia*, Available at <http://www.fxpal.com/publications/FXPAL-PR-09-495.pdf>,(2009),2 pages.

"SocialPC", Retrieved from: <http://research.microsoft.com/en-us/projects/SocialDesktop/> on Mar. 18, 2010 ,1 page.

"How to Pin a Program to Taskbar in Windows 7 and to Unpin it", Retrieved from: <http://www.techsuperb.com/sys/pin-program-to-taskbar-in-windows-7/1300.html> on Mar. 17, 2010, (Nov. 23, 2009),3 pages.

Norman, George "How to Pin Windows Update to the Windows 7 Taskbar", Retrieved from: <http://www.findmysoft.com/how-to/Pin-Windows-Update-to-the-Windows-7-Taskbar/> on Mar. 17, 2010, (Nov. 4, 2009),2 pages.

"Start Menu, Taskbar, Quick Launch, Sidebar, Desktop", Retrieved from: <http://optimisingpc.com/vista/startmenu_quicklaunch_desktop_sidebar.html> on Mar. 17, 2010, 8 pages.

"Kurzweil 3000 Taskbar", Available at <http://kesi.com/files/Kurzweil%203000%20V10%20Taskbar.pdf>,(Mar. 17, 2010),pp. 1-14.

"Taskbar Tools", Retrieved from: <http://www.freepims.com/taskbartools.html>on Mar. 17, 2010, 3 pages.

Smith, Greg et al., "GroupBar: The TaskBar Evolved", *Proceedings of OZCHI 2003*, Available at <http://citeseerx.ist.psu.edu/viewdoc/download?doi=10.1.1.60.8190&rep=rep1&type=pdf>,(2003),pp. 1-10.

Niru, "Disable Crash Recovery Restore Session Option on Firefox 2", Retrieved from: <http://www.astahost.com/Disable-Crash-Recovery-Restore-Session-Option-Firefox-2-t15275.html> on Mar. 18, 2010, (Mar. 23, 2007),6 pages.

Drislane, Helen "IEBlog", Retrieved from: <http://blogs.msdn.com/ie/archive/2008/09/30/ie8-tab-grouping.aspx> on Mar. 18, 2010, (Sep. 30, 2008),18 pages.

"Apache MyFaces", Retrieved from: <http://myfaces.apache.org/orchestra/myfaces-orchestra-core/multiwindow.html> on Mar. 18, 2010, (Dec. 18, 2009),3 pages.

Kalani, Amit "Implementing Navigation for the User Interface", *Chapter 13 of MCAD/MCSD Training Guide (70-315): Developing and Implementing Web Applications with Visual C# and Visual Studio.NET*, Available at <www.techcontent.com/TG70315Ch03.pdf>,(Nov. 26, 2002),74 pages.

"Store Groups of Tabs & Favourites with the Freshstart Chrome", Retrieved from: <http://www.makeuseof.com/dir/store-groups-tabs-favourites-freshstart-chrome-extension/> on Mar. 18, 2010, 8 pages.

Miller, Larry "New Better Browsers to surf the web Safer", Retrieved from: <http://www.qondio.com/new-better-browsers-to-surf-the-web-safer> on Mar. 18, 2010, (Nov. 14, 2008),1 page.

"Tab Groups", Retrieved from: <http://paranoid-androids.com/tabgroups/> on Mar. 18, 2010, (Feb. 5, 2007),1 page.

"Welcome to IE-Vista", Retrieved from: <http://www.ie-vista.com/tabs_groups.html> on Mar. 18, 2010, (Dec. 18, 2008),2 pages.

"Wiki: Features of the Opera Web Browser (1/2)", Retrieved from: <http://wapedia.mobi/en/Features_of_the_Opera_web_browser> on Mar. 18, 2010, (Mar. 11, 2010),4 pages.

Chinnathambi, Kirupa "Windows 7: Taskbar Icon Overlay", Retrieved from: <http://www.kirupa.com/blend_wpf/windows7_taskbar_icon_overlay.htm> on Mar. 18, 2010, (Feb. 17, 2010),4 pages.

"Notifying Users in Taskbar Application", Retrieved from: <http://www.beansoftware.com/Windows-Forms-Tutorials/Taskbar-Notification.aspx> on Mar. 18, 2010, 3 pages.

"Desktop Notification Client", Retrieved from: <http://www.wizmailer.com/tutorials/04%20Desktop%20Notification%20Client.pdf> on Mar. 18, 2010, 8 pages.

"Taskbar", Retrieved from: <http://msdn.microsoft.com/en-us/library/aa511446.aspx#overlay> on Mar. 18, 2010, 19 pages.

Sender, Boaz "The Internet as Desktop", Retrieved from: <http://www.htmltimes.com/google-docs-gears-fluid.php> on Mar. 18, 2010, (Oct. 15, 2008),3 pages.

"Windows Software Reviews", Retrieved from: <http://www.softpedia.com/reviews/windows/Google-Chrome-Inside-Out-Review-92938.shtml> on Mar. 18, 2010, Google Chrome Review,(Sep. 3, 2008),7 pages.

"Web Browser Session Restore Forensics", Harry Parsonage, Available at <http://computerforensics.parsonage.co.uk/downloads/WebBrowserSessionRestoreForensics.pdf>,(Jan. 2010),12 pages.

Cabello, Percy "All About Firefox 3.5, Available Now", Retrieved from: <http://mozillalinks.org/wp/2009/06/all-about-firefox-3-5-available-now/> on Mar. 18, 2010, (Jun. 30, 2009),25 pages.

"Turning Google Mail into a Desktop Application with a Site Specific Browser", Retrieved from: <http://www.geekosity.org/?p=188> on Mar. 18, 2010, (May 6, 2009),8 pages.

"Hana", Retrieved from: <http://alloutsoftware.com/products/hana/> on Mar. 18, 2010, (2009),2 pages.

Gertner, Matthew "Bridging Desktop and Web Applications, Part 2", Retrieved from: <http://techcrunch.com/2008/04/07/bridging-desktop-and-web-applications-part-2/> on Mar. 18, 2010, (2008),3 pages.

"Introducing Pyro 1.7", Retrieved from: <http://www.karppinen.fi/pyro/> on Mar. 18, 2010, (2008),2 pages.

"Mozilla Wiki", Retrieved from: <https://wiki.mozilla.org/Site-Specific_Preferences> on Mar. 18, 2010, (May 3, 2007),14 pages.

"Bubbles", Retrieved from: <http://bubbleshq.com/features> on Mar. 18, 2010, (Oct. 3, 2008),3 pages.

Gandhi, Rajiv et al., "Domain Name Based Visualization of Web Histories in a Zoomable User Interface", *Proceedings of the 11th International Workshop on Database and Expert Systems Applications*, Available at <http://citeseerx.ist.psu.edu/viewdoc/download?doi=10.1.1.34.9168&rep=rep1&type=pdf>,(2000),8 pages.

Larrondo-Petrie, Maria M., "A Domain Analysis of Browser Architectures, Languages and Features", *Southcon '96*, Available at <http://ieeexplore.ieee.org/stamp/stamp.jsp?tp=&arnumber=535061>,(Jun. 1996),pp. 168-174.

"Password Manager, Automatic Login Application to Fill Login Forms , Usernames and Passwords", Retrieved from: <http://www.codeproject.com/KB/recipes/Automatic_Login.aspx> on Mar. 18, 2010, (Apr. 27, 2007),6 pages.

Endler, David "Brute-Force Exploitation of Web Application Session IDs", *iDEFENSE Inc.*, Available at <http://www.cgisecurity.com/lib/SessionIDs.pdf>,(Nov. 1, 2001),pp. 1-40.

Volodarsky, Michael "Design and Deploy Secure Web Apps with ASP.NET 2.0 and IIS 6.0", Retrieved from: <http://msdn.microsoft.com/en-us/magazine/cc163702.aspx> on Mar. 18, 2010, (Nov. 2005),15 pages.

"Final Office Action", U.S. Appl. No. 12/814,290, (Sep. 11, 2012),11 pages.

"Final Office Action", U.S. Appl. No. 12/814,368, (May 11, 2012),20 pages.

"Non-Final Office Action", U.S. Appl. No. 12/814,290, (Apr. 26, 2012),10 pages.

"Non-Final Office Action", U.S. Appl. No. 12/814,312, (Oct. 3, 2012),12 pages.

"Non-Final Office Action", U.S. Appl. No. 12/814,312, (Apr. 26, 2012),12 pages.

"Non-Final Office Action", U.S. Appl. No. 12/814,359, (Jun. 29, 2012),6 pages.

"Non-Final Office Action", U.S. Appl. No. 12/814,383, (Jul. 6, 2012),8 pages.

"Restriction Requirement", U.S. Appl. No. 12/814,374, (Sep. 24, 2012),6 pages.

"Final Office Action", U.S. Appl. No. 12/814,383, (Oct. 23, 2012), 10 pages.

"Non-Final Office Action", U.S. Appl. No. 12/814,341, (Nov. 15, 2012), 10 pages.

"Non-Final Office Action", U.S. Appl. No. 12/814,374, (Oct. 18, 2012), 8 pages.

"Notice of Allowance", U.S. Appl. No. 12/814,383, (Dec. 19, 2012), 4 pages.

"Restriction Requirement", U.S. Appl. No. 12/814,341, (Oct. 11, 2012), 6 pages.

"Actice Desktop", Retrieved from <http://en.wikipedia.org/w/index.php?title=Active_Desktop&oldid=354278914> on Feb. 6, 2013, (Apr. 6, 2010), 3 pages.

"Final Office Action", U.S. Appl. No. 12/814,359, (Jan. 24, 2013), 8 pages.

"Final Office Action", U.S. Appl. No. 12/814,374, (Feb. 22, 2013), 8 pages.

"Non-Final Office Action", U.S. Appl. No. 12/814,368, (Feb. 6, 2013), 20 pages.

"The Service Detail", *RBD Instruments, Inc., Spring Newsletter*, Available at <http://www.rbdinstruments.com/Newsletters/2009%20Spring%20Newsletter.pdf>, (2009, 13 pages.

\* cited by examiner

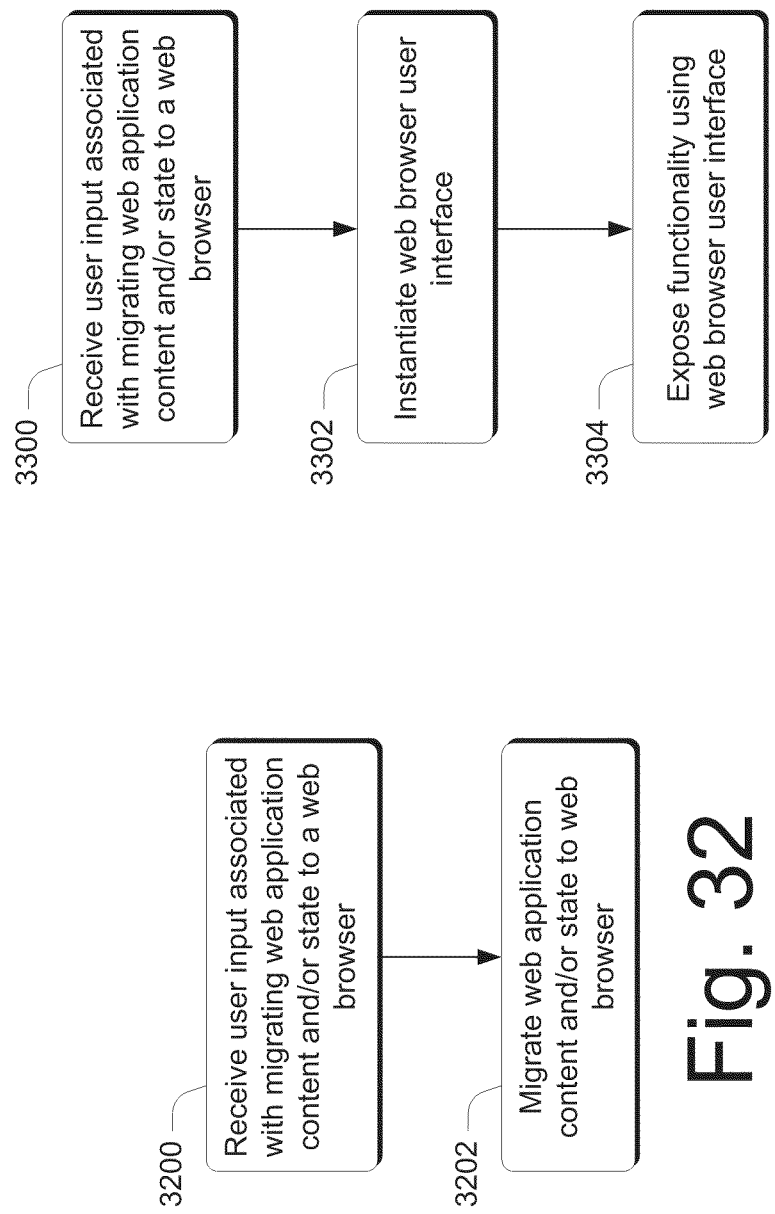

CREATING AND LAUNCHING A WEB APPLICATION WITH CREDENTIALS

BACKGROUND

More recently, industry has begun to focus on the notion of integrating web applications or websites with a user's computer desktop environment or "desktop". There are, however, challenges associated with doing so. For example, today it is difficult for websites to define the boundaries of their sites for the purpose of desktop integration. Thus, end-users are left to define the boundaries through client-side script that they develop themselves. This can be problematic because an end-user may not necessarily know how a particular web site is constructed. For example, the end user may not necessarily know all of the links, relationships between web properties, or other nuances employed by a website to provide functionality to the user. Accordingly, the end-user's script may not appreciate these links or nuances and, hence, can lead to an undesirable or broken user experience.

In addition, users today face what is known as a dual boot problem. Specifically, users are forced to boot their personal computers, start their browsers, and finally launch a particular web application that they wish to work within. This problem is compounded by the fact that browsers can provide too many distractions for users, such as those that appear in a browser's chrome, and do not allow the users to simply concentrate on a particular task at hand associated with a web application.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide a mechanism to allow end users to install web applications and websites onto a client device, such as a client device desktop. In accordance with one or more embodiments, client-side code can be utilized to allow developers associated with a website to define boundaries associated with user interaction, and have those boundaries enforced by a run-time engine. In at least some embodiments, developers can provide, through JavaScript code, various configurations for the creation of a start menu shortcut, navigation, and so-called jumplist integration, as well as a number of other features.

BRIEF DESCRIPTION OF THE DRAWINGS

The same numbers are used throughout the drawings to reference like features.

FIG. 32 is a flow diagram that describes steps in a method in accordance with one or more embodiments.

FIG. 33 is a flow diagram that describes steps in a method in accordance with one or more embodiments.

DETAILED DESCRIPTION

Overview

Figure 1:
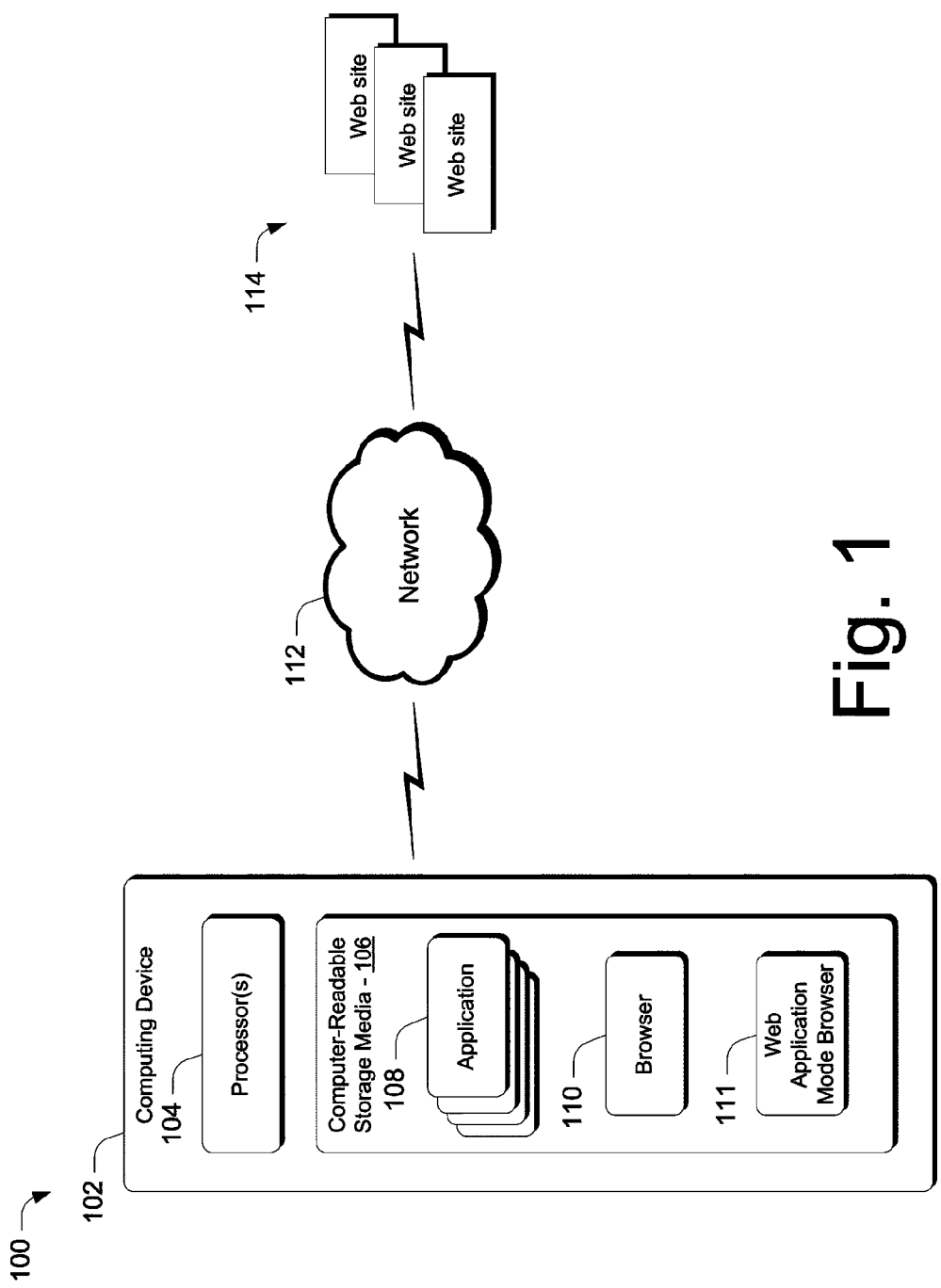
FIG. 1 illustrates an operating environment in which various principles described herein can be employed in accordance with one or more embodiments.

Various embodiments provide a mechanism to allow end users to install web applications and websites onto a client device, such as a client device desktop. In accordance with one or more embodiments, client-side code can be utilized to allow developers associated with a website to define boundaries associated with user interaction, and have those boundaries enforced by a run-time engine. In at least some embodiments, developers can provide, through JavaScript code, various configurations for the creation of a start menu shortcut, navigation, and so-called jumplist integration, as well as other features.

Boundaries can be thought of as a developer-defined experience that relates to how functionality is exposed to an end-user. Boundaries are associated with website domains, such as top-level domains and sub-domains that might be associated with separate applications, or a subset of websites that are hosted on a domain. Hence, the boundaries can be defined by a set of domains, sub-domains, folders, sub-sites, protocols, hosts, paths, and the like, that are utilized to make a particular web application work.

In one or more embodiments, websites can opt into the functionality described above and below. In this case, developers can provide code which, in some instances is expressed in JavaScript, which defines the boundaries of the user's experience with their website. Alternately or additionally, websites that do not opt into the functionality described above and below can have a default experience provided for them.

In the discussion that follows, a section entitled "Operating Environment" is provided and describes one environment in which one or more embodiments can be employed. Following this, a section entitled "Integration Infrastructure" describes infrastructure that enables web applications to be integrated onto a client device in accordance with one or more embodiments. Next, a section entitled "Jumplist Integration" describes how so-called jumplists can be integrated in accordance with one or more embodiments. Next, a section entitled "Taskbar Pinning" describes how web applications can be pinned to a taskbar in accordance with one or more embodiments. Following this, a section entitled "Associating Credentials and Login Sessions" describes how credentials and login sessions can be associated in accordance with one or more embodiments. Next, a section entitled "Creating and Launching a Web Application with Associated Credentials" describes how a web application can be created and launched in accordance with one or more embodiments. Following this, a section entitled "Web Application Task Sessions" describes the notion of task sessions in accordance with one or more embodiments. Next, a section entitled "Transitioning Between a Web Application and a Browser" describes how transitions can occur between a web application and a browser in accordance with one or more embodiments. Following this, a section entitled "Creating a Transient Web Application from a Browser" describes how a transient web application can be created from a browser in accordance with one or more embodiments. Next, a section entitled "Converting a Transient Web Application into an Installed Web Application" describes how a transient web application can be converted into an installed web application in accordance with one or more embodiments. Following this, a section entitled "Web Application Super Home Button" describes a home button associated with a web application in accordance with one or more embodiments. Last, a section entitled "Example System" describes an example system that can be utilized to implement one or more embodiments.

Consider now an example operating environment in which one or more embodiments can be implemented.

Operating Environment

FIG. 1 illustrates an operating environment in accordance with one or more embodiments, generally at 100. Environment 100 includes a computing device 102 having one or more processors 104, one or more computer-readable storage media 106 and one or more applications 108 that reside on the computer-readable storage media and which are executable by the processor(s). The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 41.

In addition, computing device 102 includes a software application in the form of a web browser 110. Any suitable web browser can be used examples of which are available from the assignee of this document and others. In addition, computer-readable storage media 106 can include a web application mode browser 111 that operates as described above and below. The web application mode browser 111 serves as a runtime engine that receives and makes API calls from and to websites respectively, oversees web application installation processes, enforces boundaries, and enables functionality as described above and below. In operation, the web application mode browser is a pared down version of a full browser, with many of the normal browser functionalities turned off. In some instances, the web application mode browser can be thought of as a "chrome-less" browser that does not include many of the usual browser controls. Some commands may, however, be exposed through a miniature control bar. The web application mode browser thus removes many of the distractions for a user and permits a directed, website-defined user experience in which the websites can control how the user interacts with their web application.

In operation, the web application mode browser can be considered to reside logically between a website and the client device's operating system. Thus, the web application mode browser receives calls from websites and can, responsively, make operating system calls to affect the functionality described herein. Likewise, the web application mode browser can receive calls from the operating system, that will affect the functionality of the website. For example, the operating system exposes APIs that enable interaction with a desktop's task bar. The web application mode browser can receive calls from a website and, responsively, can make API calls that enable task bar functionality as will become apparent below.

Web application mode browser 111 can be implemented as a standalone component. Alternately or additionally, the web application mode browser 111 can be implemented as part of applications 108 and/or browser 110.

In addition, environment 100 includes a network 112, such as the Internet, and one or more web sites 114 from and to which content can be received and sent. Such content can include content, such as web applications, that is integrated onto the client desktop or otherwise useable through the client device, as described above and below.

Computing device 102 can be embodied as any suitable computing device such as, by way of example and not limitation, a desktop computer, a portable computer, a handheld computer such as a personal digital assistant (PDA), cell phone, and the like.

Having described an example operating environment, consider now a discussion of infrastructure that allows web applications to be integrated onto a client device.

Integration Infrastructure

In accordance with one or more embodiments, websites can opt into domain navigation that is provided as part of a more general "site mode" experience. Domain navigation enables websites to customize the behavior of their existing websites when users access links inside and outside of specific domains. When accessing links inside developer-specified boundaries, content can be rendered and consumed within a web application window that is rendered by the web application mode browser as part of an associated web application. When accessing links outside of the developer-specified boundaries, associated content can be rendered and consumed inside of a default browser that is outside of the web application mode browser. This allows a website to define what domains should be treated as an extension of the website, and which should not.

In one or more embodiments, navigation domains can be defined by web developers and identify links whose content is displayed by the web application mode browser as part of the integrated website, or outside of the web application mode browser in the default browser. In addition, default domain parameters can be defined that are used to associate a collection of web application pages together.

As an example, consider the following in-line domain page definition:

---
*contoso.crm.dynamics.com\*;*.microsoft.com\*;
---

This domain page definition will allow URIs of the form just below to be displayed in the same desktop web application window:

---
sales. contoso.crm.dynamics. com\*
hr.contoso.crm.dynamics\*
*.microsoft.com\crm\
---

Likewise, this domain page definition will force other URIs to be displayed outside of the desktop web application window, even if the link references are inside a page within the desktop web application window:

---
www.bing.com
home.live.com
---

In the above domain page definition, wild cards are utilized inside the web application installation API. This API is typically called by the website when the user selects a website integration link provided by the website. This API can populate a web application file or ".webapp" file with information and content in the desktop, task bar, or start menu, or any other suitable location that will be used to launch a website shortcut. It is to be appreciated and understood that any suitable file extension can be used to designate a web application file. The navigation domains and other boundary information are stored within the .webapp file.

When the .webapp file is launched, navigation domains therewithin are enforced by the web application mode browser 111. Links selected by the user or accessed by the website continue to execute inside the web application window as long as they match the wildcard domains. However, when a website is detected that is outside of the defined navigation domains, a default browser is instantiated or otherwise used, and content associated with the website is displayed outside of the web application window and inside the default browser.

Figure 2:
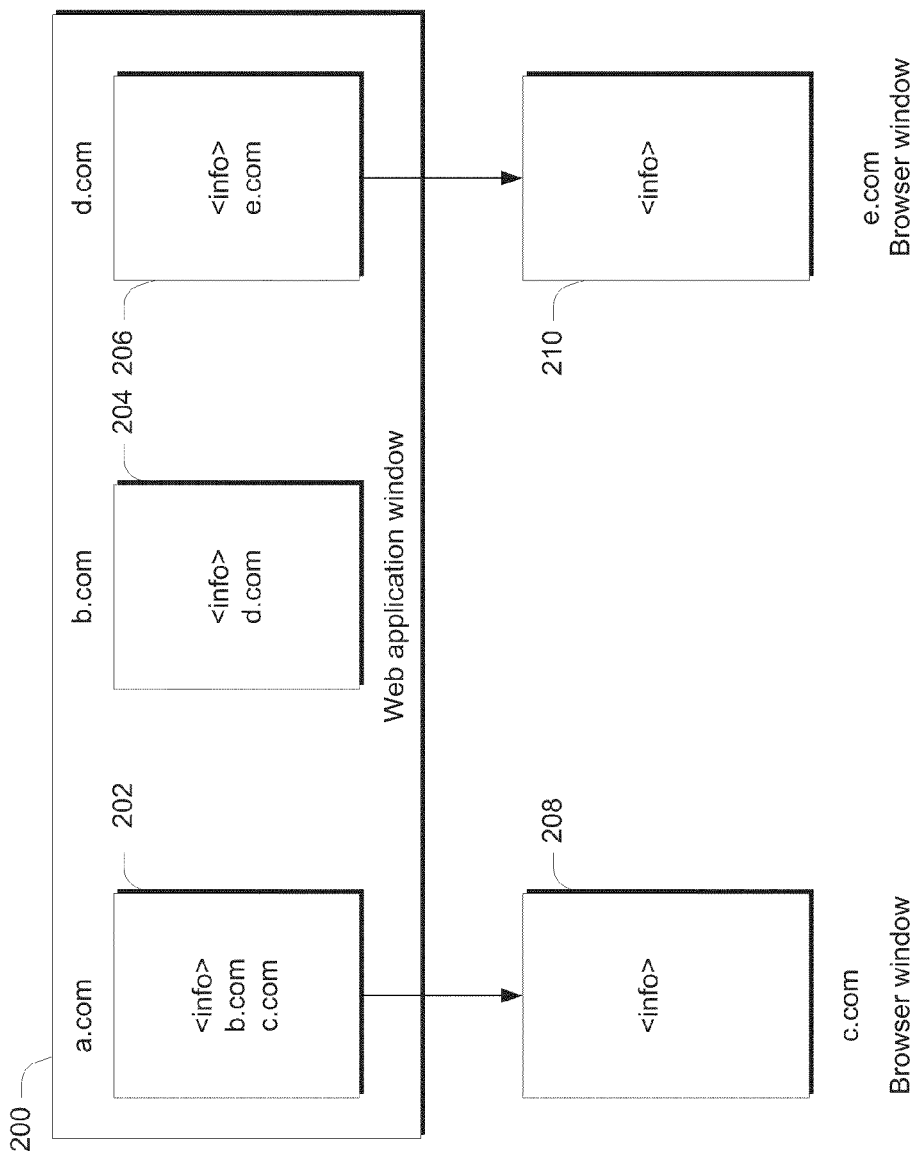
FIG. 2 illustrates a web application window in accordance with one or more embodiments.

As an example, consider FIG. 2, which illustrates a web application window 200 having a navigation domain set of a.com (202), b.com (204) and d.com (206), which implies that all pages from these domains are displayed inside the web application window 200. When pages from c.com (208) or e.com (210) are accessed from within the web application window 200, they are displayed in the default browser window and not in the web application window 200.

Figure 3:
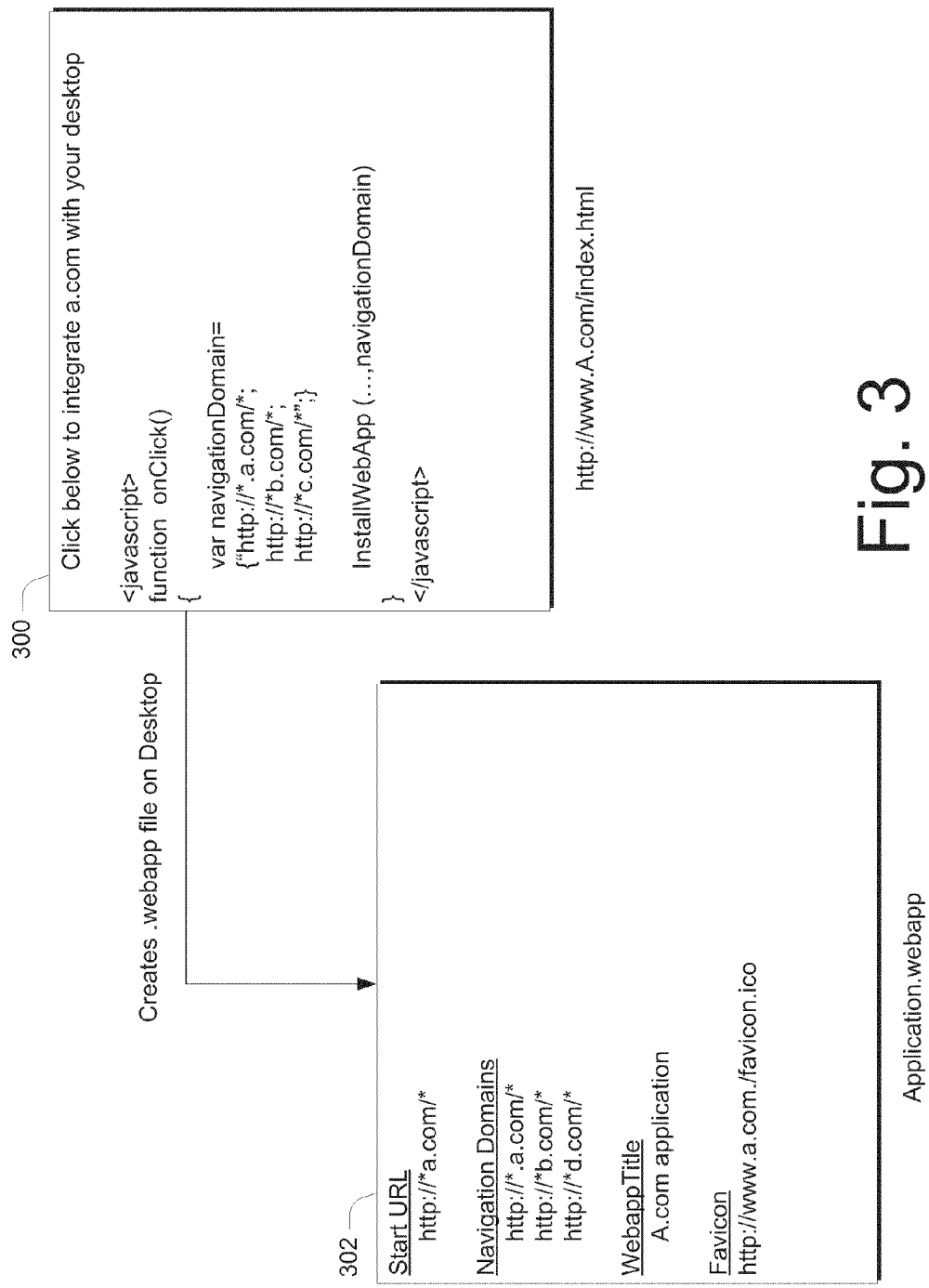
FIG. 3 illustrates a JavaScript API in accordance with one or more embodiments.

FIG. 3 illustrates a JavaScript API in accordance with one or more embodiments at 300. The illustrated JavaScript API enables a website to integrate a web application with a client desktop. The API defines the navigation domains that will be enforced by the web application or run-time engine. In this example, the navigation domains are described using wildcard expressions as illustrated above. This API enables population or updating of a .webapp application file 302 with content and information on the client device and stores the navigation domains and other information in it. These navigation domains are enforced when the web application is launched.

In the illustrated and described embodiment, .webapp application file 302 includes information that the website has defined for its site mode configuration. This information includes a start URL which is the initial page that is displayed by the web application mode browser, all of the navigation domains that the website has specified, a web application title, and a so-called favicon. Other information can be included, as will be described below.

Now, once the web application is launched on client side, the web application mode browser reads the web application file and enforces the boundaries defined therein. As noted above, because the web application experience is defined by developers who are knowledgeable of a particular website and its nuances, a complete and integrated user experience can be provided.

Figure 4:
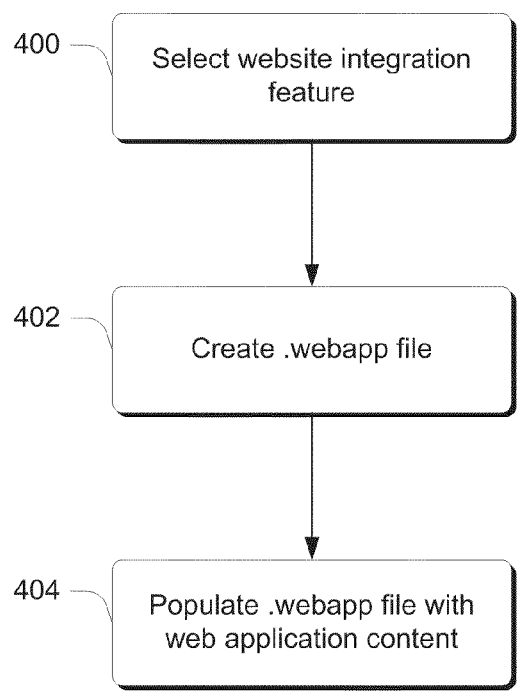
FIG. 4 is a flow diagram that describes steps in an installation method in accordance with one or more embodiments.

FIG. 4 is a flow diagram that describes steps in an installation method in accordance with one or more embodiments. The method can be performed by any suitable hardware, software, firmware, or combination thereof. In at least some embodiments, aspects of the method are performed by software executing on a client device.

Step 400 selects a website integration feature. The step can be performed in any suitable way. Typically, the step is performed when a user selects an instrumentality or otherwise takes an action to initiate a web application installation process. For example, a user might select a link that enables him to integrate the web application. Specific examples of how this can be done are provided below.

Step 402 creates, on the client device, a web application file—here designated ".webapp" file. This file, as initially created, can constitute an artifact or shell that can subsequently be populated with content and information received from or on behalf of the website. Step 404 populates the web application file with web application content. This step can be performed in any suitable way. For example, this step can be performed through the use of a JavaScript API examples of which are provided above and below. Alternately or additionally, this step can be performed through the use of markup, such as HTML.

Having created the web application file on the client and populated it with content, the web application can now be launched and interacted with.

Figure 5:
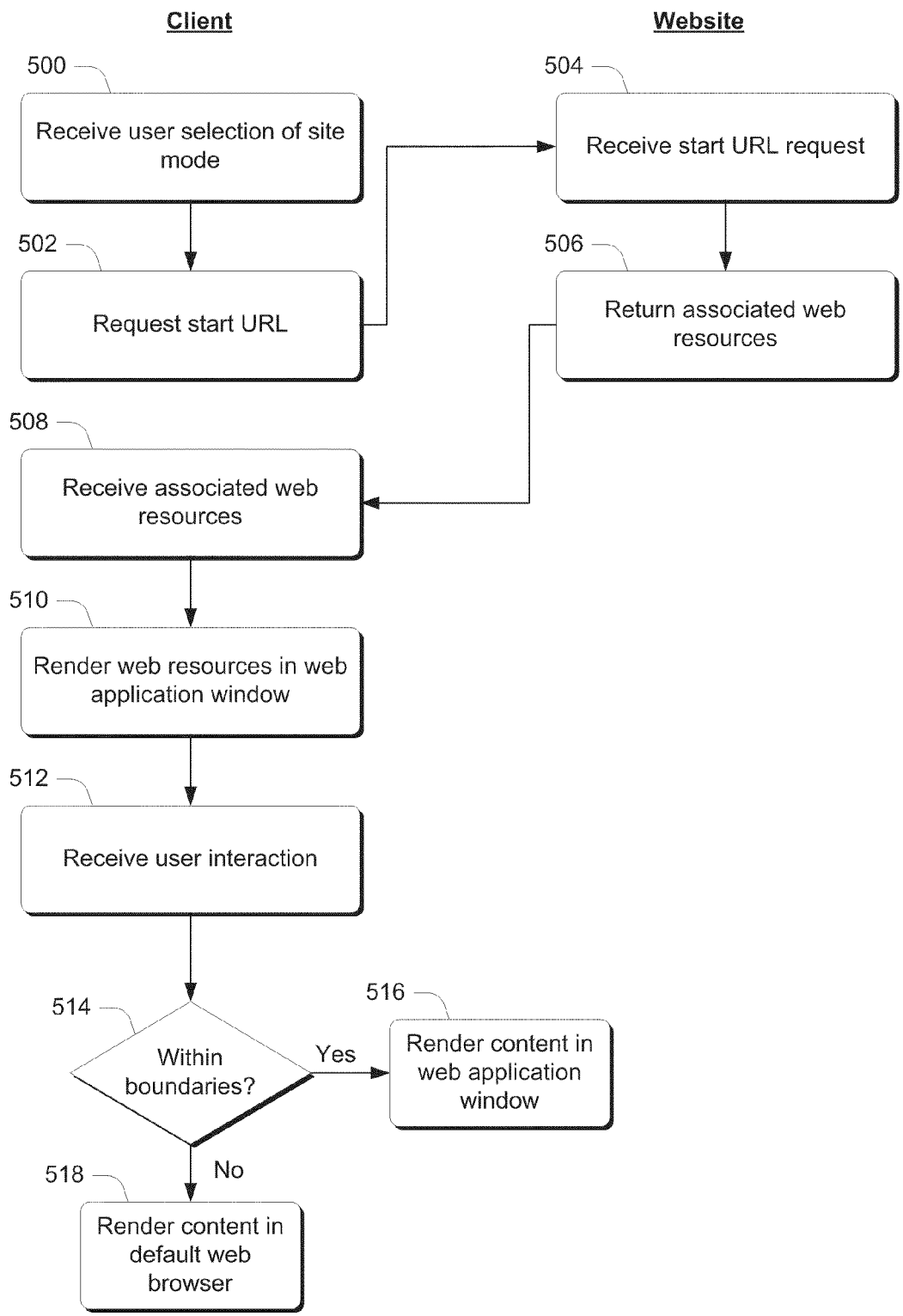
FIG. 5 is a flow diagram that describes steps in a web application interaction method in accordance with one or more embodiments.

FIG. 5 is a flow diagram that describes steps in a web application interaction method in accordance with one or more embodiments. The method can be performed by any suitable hardware, software, firmware, or combination thereof. In at least some embodiments, aspects of the method are performed by software executing on a client, and software executing at a server supporting a website. Accordingly, one column of the diagram is designated "Client" to designate those steps performed by or at the client by, for example, a web application mode browser, and one column is designated "Website" to designate those steps performed by or on behalf of the website.

Step 500 receives a user selection of a site mode. This step can be performed in any suitable way. For example, a shortcut installed on the client desktop can be utilized to receive a site mode selection. Responsive to receiving the site mode selection, step 502 requests a start URL. The start URL can be found in the web application file described above.

Step 504 receives the start URL request. Step 506 returns associated web resources, including content associated with the start URL, to the client.

Step 508 receives the associated web resources and step 510 renders the web resources in a web application window. As described above, the web application window is rendered by the web application mode browser. Step 512 receives a user interaction with respect to the resources rendered in the web application window. The user interaction can include any suitable type of user interaction. For example, the user interaction may include a navigation activity that originates from within the web application window. Step 514 ascertains whether the user interaction is within the boundaries defined by the web application file. If the user interaction is within the boundaries defined by the web application file, step 516 renders content associated with the user interaction in the web application window. If, on the other hand, the user interaction is not within the boundaries defined by the web application file, step 518 renders content associated with the user interaction in a default web browser.

In this manner, boundaries defined by website developers for particular websites can be enforced to ensure that the user experience is preserved as desired by the developers. For example, the website defined Start URL is the home page, and subsequent access to the home page in web application mode navigates to the Start URL, rather than the user's originally defined browser home page. This allows for quick access to the web application specific page, instead of some unrelated home page. This alleviates end-users from having to define their own site-specific experiences which may or may not work accurately. As such, a complete, integrated, and intelligently-managed experience can be provided for end-users.

Having described an example installation and interaction experience, consider now the notion of jumplist integration.

Jumplist Integration

In one or more embodiments, developers can enable websites to define a series of so-called jumplist tasks during desktop integration that can be used to interact with the websites. In addition, in at least some embodiments websites can create and update custom jumplists.

A jumplist can be thought of as a list that constitutes a set of relevant tasks or content that is presented to the user. Through jumplists, websites can promote a distillation of relevant and useful information to users. Jumplists are related to the capabilities or functionalities of a particular web application. For example, a jumplist for an e-mail application might include tasks that give the user the ability to open a contact, create a new e-mail message, and the like. In some instances, jumplists can include a list of relevant and most-often used commands and data.

In one or more embodiments, jumplist functionality can be implemented to include both static elements and dynamic elements.

Developers can define the static elements during the web application installation process that populates the web application file, as described above. Settings associated with the static elements can be stored inside the web application file. In one or more embodiments, the settings can include a list name and associated tasks. In at least some instances, the static elements can constitute elements that represent commonly-used functionality.

Settings associated with the dynamic elements can be driven by website pages that run inside the web application window. These settings include settings that dynamically expose discernible indicia for a user. For example, one setting can add an item to a custom jumplist, and one setting can display an overlay icon, examples of which are provided below. In at least some embodiments, dynamic settings can be cleared each time the web application is launched and can be configured by web application script code.

Figure 6:
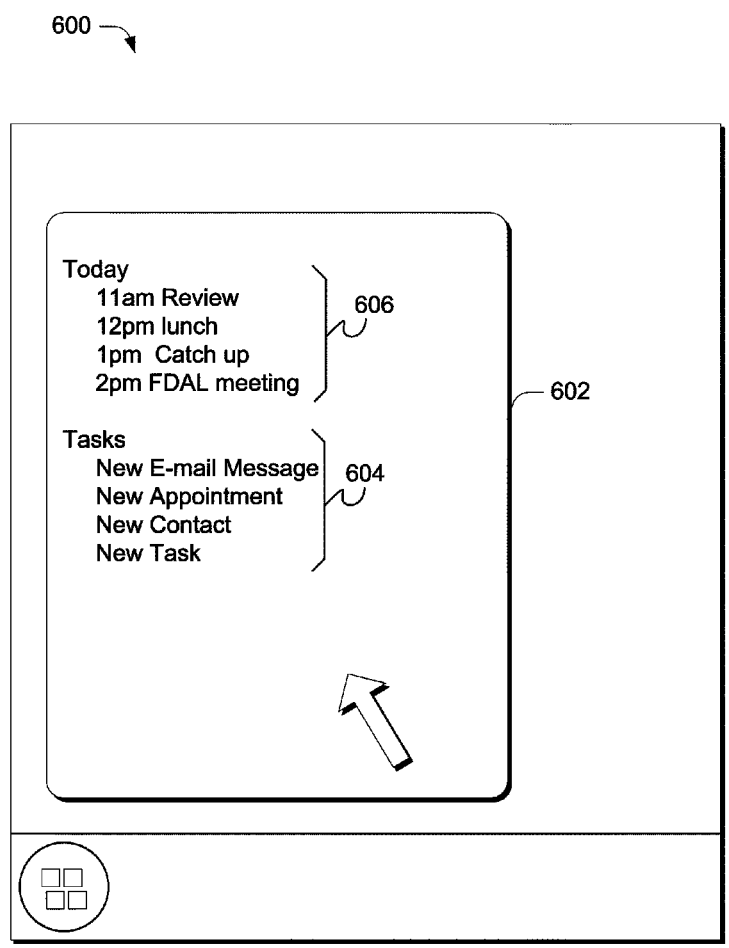
FIG. 6 illustrates a portion of a client desktop in accordance with one or more embodiments.

As an example of a custom jumplist in accordance with one embodiment, consider FIG. 6, which illustrates a portion of a client desktop generally at 600. A custom jumplist 602 is exposed in accordance with one or more embodiments. Here, static elements are illustrated at 604 and dynamic elements are illustrated at 606. In this example, the static elements list name is "Tasks" and the tasks or static elements include "New E-mail Message", "New Appointment", "New Contact", and "New Task". The dynamic elements list name is "Today" and the tasks or dynamic elements include, in this example, reminders that are generated from a user's calendar. The dynamic elements are dynamically populated by an associated website. So, in this example, the dynamic elements or content are associated with providing notifications to the user, typically independent of a user's action.

Figure 7:
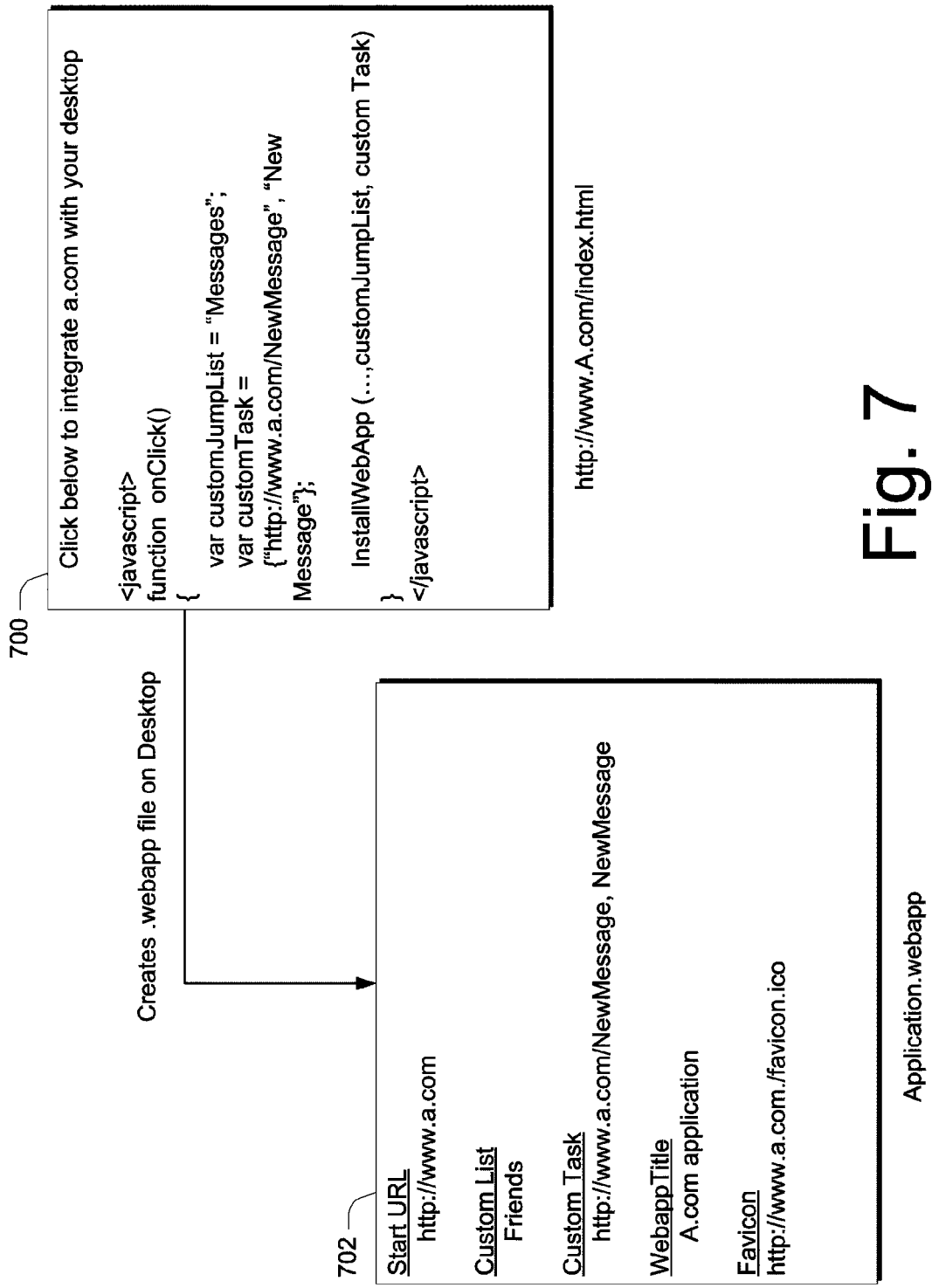
FIG. 7 illustrates a JavaScript API in accordance with one or more embodiments.

As noted above, jumplists can be defined during the desktop integration process. The tasks and the jumplist definition can be stored inside the web application file. As an example, consider FIG. 7 which illustrates a JavaScript API in accordance with one or more embodiments at 700. The illustrated JavaScript API enables a website to integrate with a client desktop and to define a jumplist. This JavaScript API can be the same as or similar to the one described with respect to FIG. 3, except for the presence of "custom task" and "customJumpList." For brevity, some of the FIG. 3 content has been omitted. In at least some embodiments, initial creation of a static list of jumplist tasks can be defined by markup, e.g. using HTML tags, that are defined inside an HTML document.

For example, consider the example just below that uses meta tags to describe the static list functionality:

```
<META name="msapplication-task"
content="name=Task;uri=http://marap/test3.html;icon-
uri=http://marap/icon3.ico"/>
```

When a task is executed, in one or more embodiments, there are a couple options. For example, the URL associated with the task can be opened inside the same web application/ browser window that contains the currently viewed webpage. Alternately or additionally, a new page can be launched. Alternately or additionally, a new pop-up window can be displayed.

After these parameters are defined and read by the system, they can be used when the user installs the web site on their desktop, as by adding it to the Start Menu or pinning it to the task bar as described below. At the same time, in at least some embodiments, there is a set of dynamic values that can be manipulated by website client code on the jumplist.

"Custom task" is utilized by the website to define static tasks as described above. In this example, the static task is a new message static task. This API creates a .webapp application file 702 on the desktop and stores the navigation domains (as in the FIG. 3 example) and other information, such as information associated with jumplists.

In the illustrated and described embodiment, .webapp application file 702 includes information that the website has defined for its site mode configuration. This information includes a start URL, all of the navigation domains that the website has specified (not specifically illustrated), a web application title, and a so-called favicon. Other information includes the custom task associated with a new message mentioned above, and a "custom list". In this example, the custom list element is a dynamic element that can be dynamically populated by the website when the web application is running on the client. Here, the "friends" designation comprises a header that is associated with dynamic content. So, in this instance, the dynamic content is associated with providing notifications to the user when their friends are online. Here, the custom list is a separate API that does not reside in the web application. The custom task, however, resides in the web application.

In operation, items associated with the static elements can be pre-fetched and cached for when the web application is running Items associated with the dynamic elements, on the other hand, can be provided by the website on-the-fly when the web application is running. As an implementation example of how items associated with the dynamic elements can be provided to the web application on-the-fly, consider FIG. 8.

Figure 8:
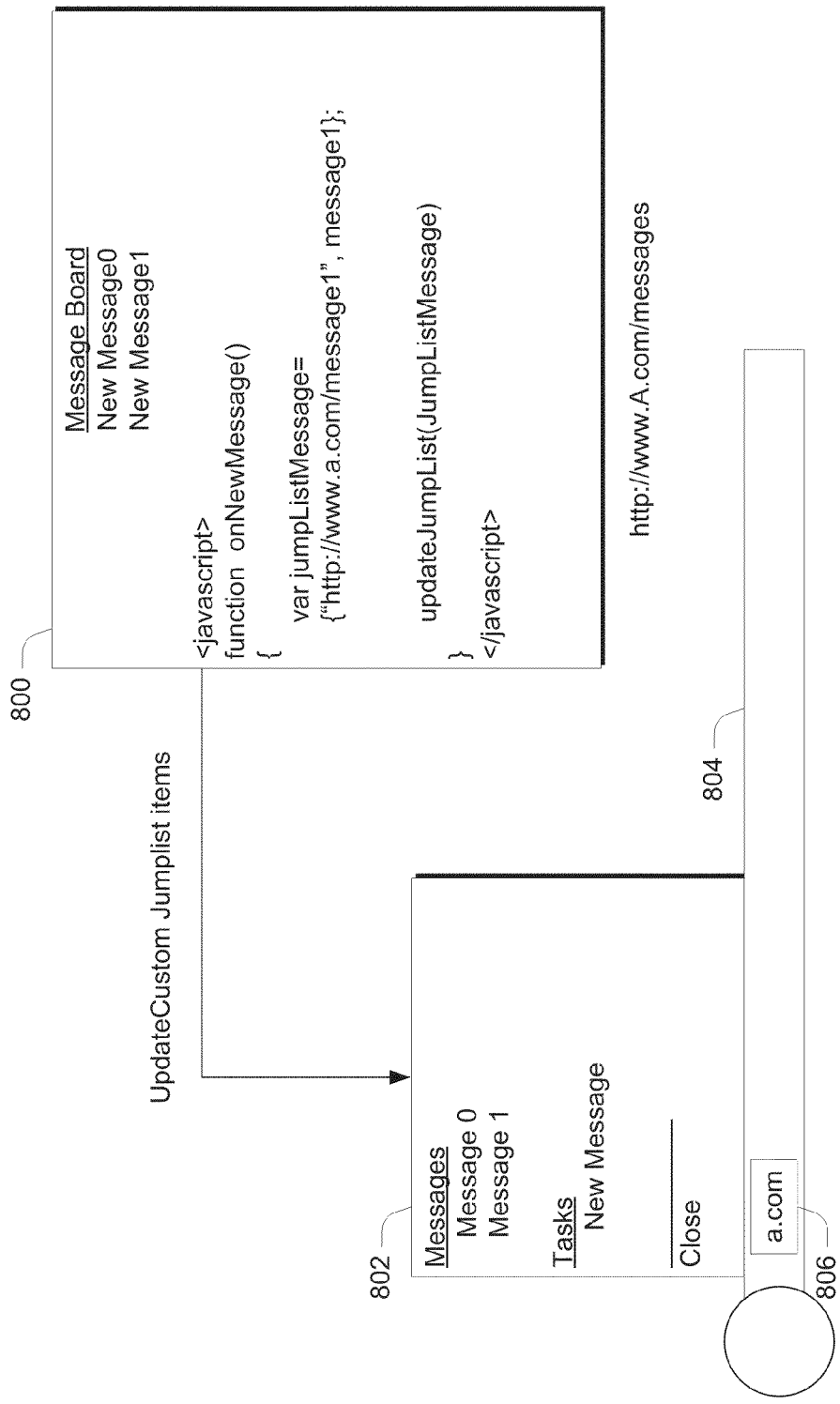
FIG. 8 illustrates dynamic interaction between a website and a custom jumplist in accordance with one or more embodiments.

FIG. 8 illustrates how a website is able to dynamically interact with the custom jumplist to allow the user to know that a message has arrived. In this example, JavaScript 800 illustrates how a website can send updates to a page that is hosted in the web application mode browser. Client-side code that is executed in the browser is responsible for receiving updates, updating the content on screen, and sending a request to the jumplist to update its list. In this example, the website is able to push information to the jumplist to provide a real time experience. Here, when a new message is received by the website, e.g. New Message0 and New Message1, a JavaScript call can be made from the web application to update jumplist 802. In at least some embodiments, a notification can appear in task bar 804 to inform the user that relevant information has been received. Notification can appear in any suitable location in the task bar and can comprise any suitable type of notification. For example, the notification can appear in or around icon 806 that is associated with the web application. Alternately or additionally, the notification can flash so as to catch the user's eye.

Figure 9:
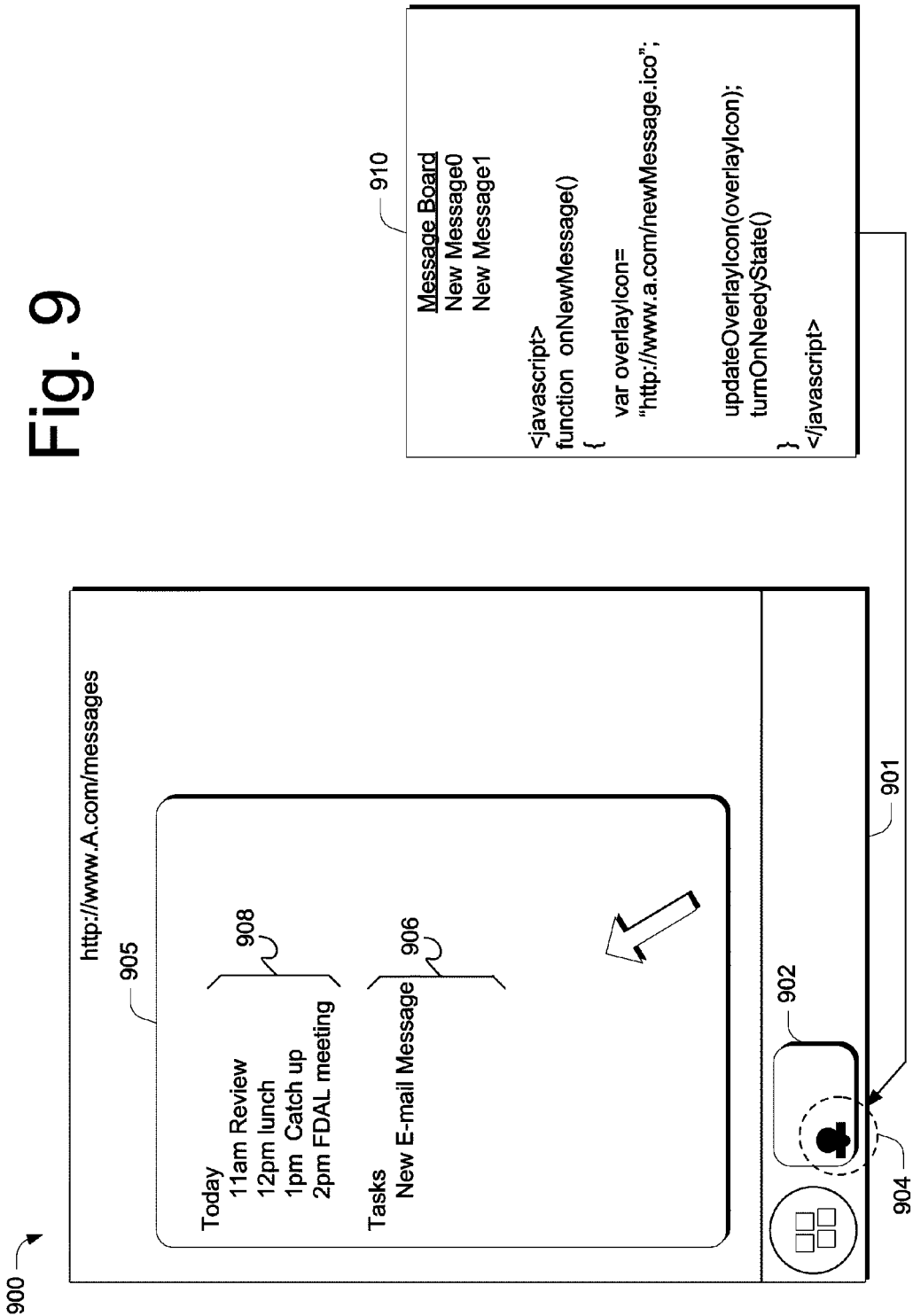
FIG. 9 illustrates a portion of a client desktop in accordance with one or more embodiments.

As an example, consider FIG. 9. There, a portion of a client desktop is illustrated generally at 900. A task bar 901 includes an icon 902 associated with a current web application. Notice here, that an overlay icon 904 has been rendered within icon 902. In this example, a user has received a new message, and the website has called into the web application, as described above, to cause overly icon 904 to be rendered within icon 902. This provides notification to the user that a new message has arrived. Responsive to seeing the overly icon 904, the user can access jumplist 905 to expose elements 908 which indicates an appointment that is currently happening or about to happen. Notice also that elements 906 are exposed as well. JavaScript excerpt 910 illustrates one example of code that can be used to update the overlay icon.

Dynamic interaction between the website and a web application can occur in various other ways. For example, in at least some embodiments a preview window can be pushed from the website to the jumplist responsive to a user's action with respect to the web site. In the illustrated and described embodiment, the preview window is a miniature view provided by the web site. The preview window can be provided responsive to any suitable type of user action. For example, in at least some embodiments, a preview window can be pushed from the website to the jumplist responsive to a mouse hover over a task bar icon associated with the web site. Alternately or additionally, a preview window can be provided by placing a cursor over the web application's task bar icon and left clicking.

Figure 10:
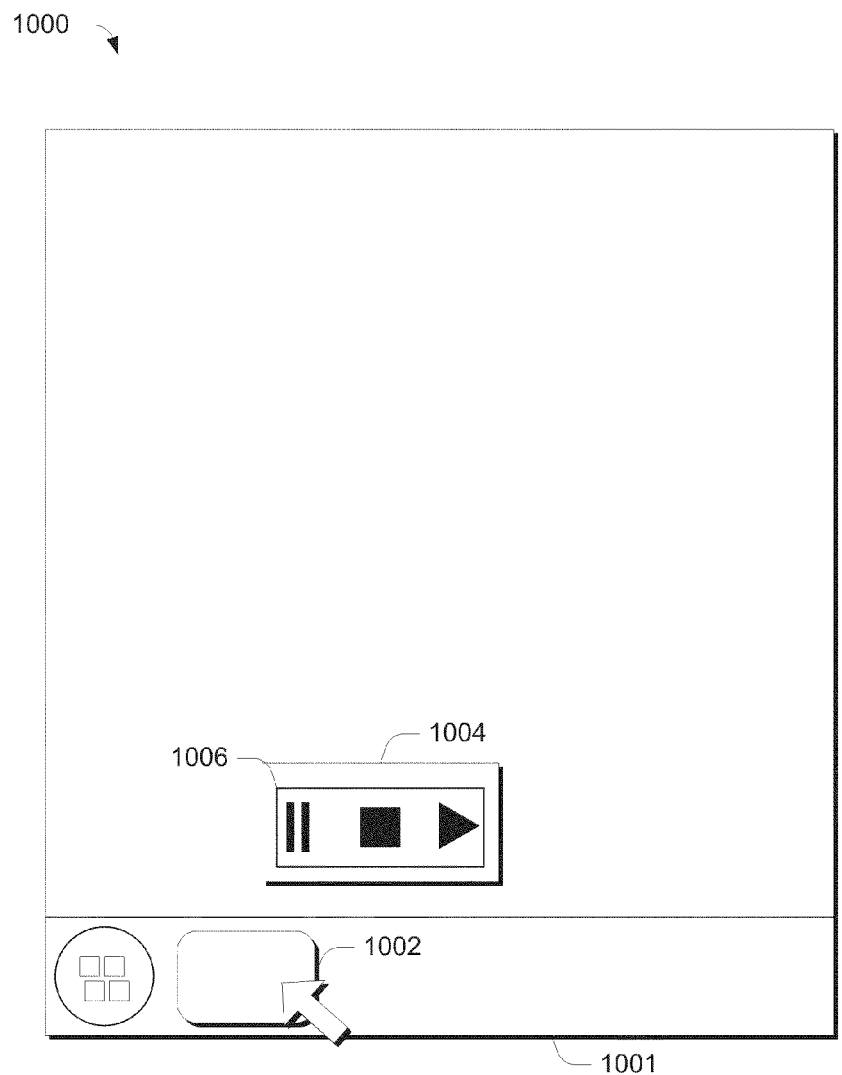
FIG. 10 illustrates a portion of a client desktop in accordance with one or more embodiments.

As an example, consider FIG. 10. There, a portion of a client desktop is illustrated generally at 1000. A task bar 1001 includes an icon 1002 associated with a current web application. Notice here, that the user has placed their cursor over icon 1002. Responsively, a preview window 1004 has been rendered. In operation, responsive to the user's action of placing their cursor over the icon, an event is transmitted to the web page. Responsive to receiving the event, the web page can then dynamically provide the preview, or cause a cached preview window to be rendered.

In at least some embodiments, the preview window can also be used by the website to define toolbar buttons and associated behaviors. For example, in the illustrated and described embodiment, the web application comprises a media player application and three toolbar buttons appear in a user interface instrumentality 1006 that is overlaid over preview window 1004. The buttons include a pause button, a stop button, and a play button. In at least some embodiments, the toolbar buttons can be implemented using client-side code that avoids having to interact with a remote server. For example, individual buttons can be registered for a particular web page. Each button is configured and assigned an ID. One "listener" is registered for all button events. When a button is pressed, an event is generated and communicated back to the browser which then propagates the event to the registered event listener. The event contains the button that was pressed. This enables disambiguation between buttons.

Implementation Example

In an implementation example, web developers can use the following JavaScript functions to update a custom list in the jumplist, and to update the task bar overlay icon:

List Creation Behavior

This defines a list name that is the title of the custom list. This value will be displayed as a list header. Optionally, an item list containing the name of the item, the URI value for that item, and an image associated with that item can be provided to populate the list initially. This functionality can be supported when the browser is started in the web application mode.

List Update Behavior

A list item value is provided to update a specific list item. The list item value includes a name for the item, a URI value for that item, and an image associated with the item. This functionality can be supported when the browser is started in the web application mode.

Set Overlay Icon

A URI value is specified that points to the icon that will be used as an overlay for the existing task bar icon. This functionality can be supported when the browser is started in the web application mode.

Set Preview Image

A URI that points to an image that should be used as the pictorial representation for the taskbar preview image (or thumbbar preview). The preview is displayed when the user clicks with the left mouse button on the taskbar icon.

Clear Overlay Icon

This removes existing overly icons on the task bar icon. This functionality can be supported when the browser is started in the web application mode.

Web developers can use the following JavaScript functions to define and modify a set of tool bar buttons that are displayed in the task bar preview window of a specific website.

Toolbar Button Installation

A list of button IDs are specified with a tool tip and image URL. The event is passed to the website for processing when the user selects a tool bar button. The website can then disambiguate between button events. This call is performed at least once when the site mode window is opened in order for the buttons to be displayed. This functionality is supported when the browser is started in the web application mode.

Update Image

This identifies the state and visibility of the button ID that is specified. The states can be enabled or disabled. In at least some embodiments, by default, the buttons are enabled. The view can be either show or hide. By default, defined buttons are visible. This functionality is supported when the browser is started in web application mode.

Figure 11:
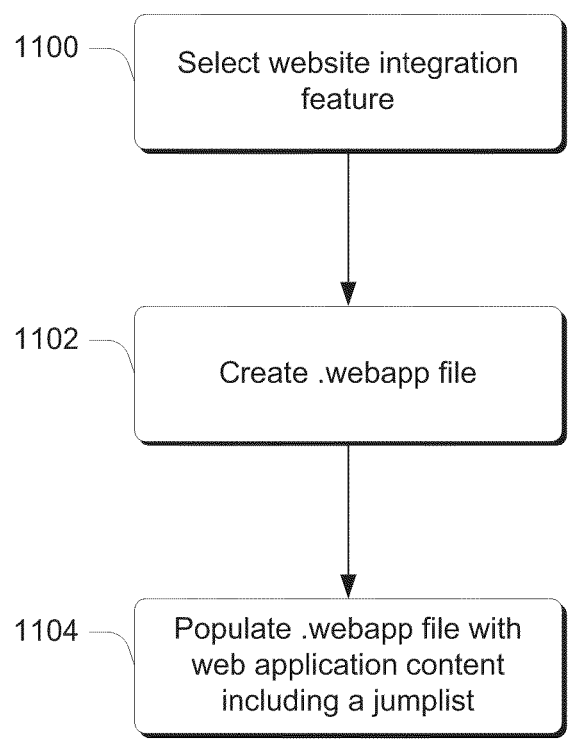
FIG. 11 is a flow diagram that describes steps in an installation method in accordance with one or more embodiments.

FIG. 11 is a flow diagram that describes steps in an installation method in accordance with one or more embodiments. The method can be performed by any suitable hardware, software, firmware, or combination thereof. In at least some embodiments, aspects of the method are performed by software executing on a client device.

Step 1100 selects a website integration feature. The step can be performed in any suitable way. Typically, the step is performed when a user selects an instrumentality or otherwise takes an action to initiate a web application installation process. For example, a user might select a link that enables him to integrate the web application. Specific examples of how this can be done are provided below.

Step 1102 creates, on the client device, a web application file—here designated ".webapp" file. This file, as initially created, can constitute an artifact or shell that can subsequently be populated with content and information received from or on behalf of the website. Step 1104 populates the web application file with web application content including, in this example, a jumplist. This step can be performed in any suitable way. For example, this step can be performed through the use of a JavaScript API an example of which is described above. Alternately or additionally, aspects of this step can be performed through the use of markup, such as HTML.

Having created and populated the web application file on the client, the web application can now be launched at any suitable time.

Figure 12:
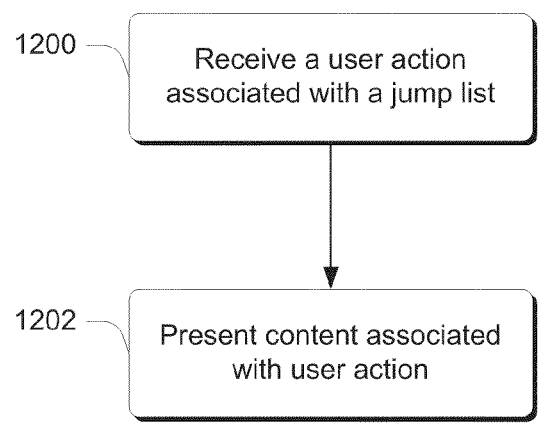
FIG. 12 is a flow diagram that describes steps of a method in accordance with one or more embodiments.

FIG. 12 is a flow diagram that describes steps of a method in accordance with one or more embodiments. The steps can be executed in connection with any suitable hardware, software, firmware, or combination thereof. In at least some embodiments, the method can be performed by software executing on a client in association with software executing on a server.

Step 1200 receives a user action associated with a jumplist. Any suitable user action can be received, examples of which are provided above. For example, in at least some embodiments, the user action can be received with respect to a specifically displayed jumplist or a jumplist that is not displayed. Alternately or additionally, the user action can be received with respect to a displayed icon that is associated with a web application. The icon can be displayed, for example, in a desktop task bar or any other suitable location. Examples of such actions are provided above.

Step 1202 presents content associated with the user action. For example, content presented may comprise the jumplist itself. The jumplist can be presented responsive to any suitable type of user action, examples of which are provided above. The content presented may also comprise content other than the jumplist itself. For example, a custom preview window can be presented responsive to a user action such as, for example, left clicking on a task bar icon. For example, a user might select to create or compose a new email message.

Figure 13:
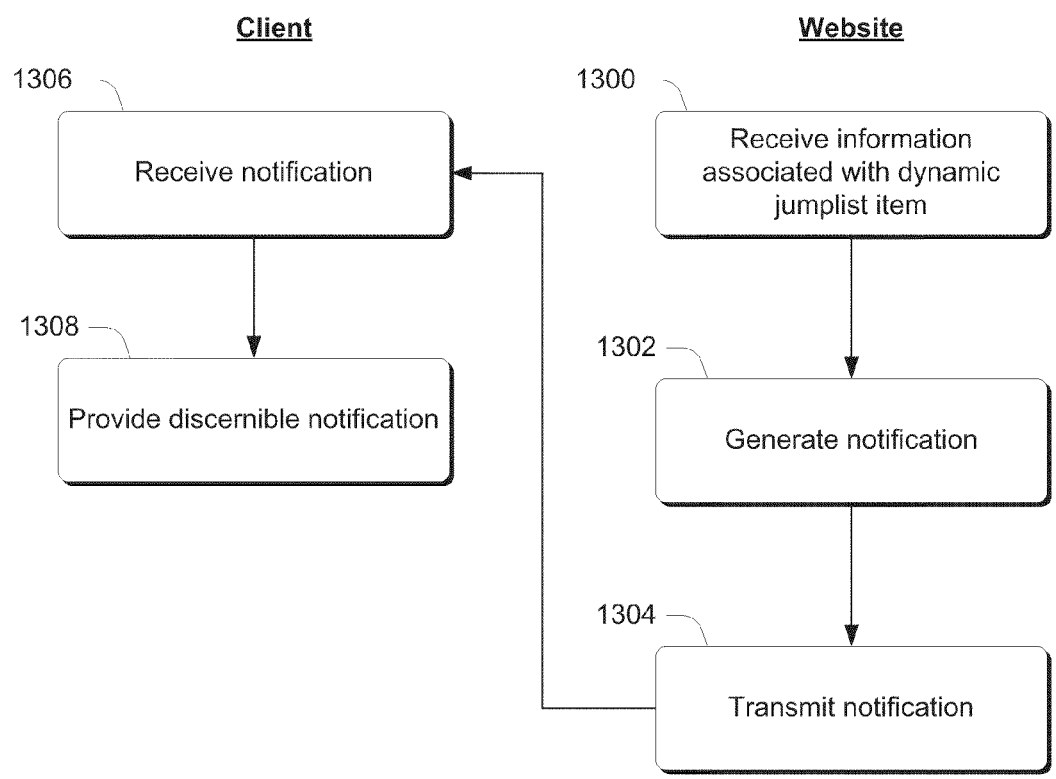
FIG. 13 is a flow diagram that describes steps in a method in accordance with one or more embodiments.

FIG. 13 is a flow diagram that describes steps in a method in accordance with one or more embodiments. The method can be performed by any suitable hardware, software, firmware, or combination thereof. In at least some embodiments, aspects of the method are performed by software executing on a client, and software executing at a server supporting a website. Accordingly, one column of the diagram is designated "Client" to designate those steps performed by or at the client, and one column is designated "Website" to designate those steps performed by or on behalf of the website.

Step 1300 receives information associated with a dynamic jumplist item. Any suitable jumplist item can serve as the basis upon which information is received, examples of which are provided above. Step 1302 generates a notification and step 1304 transmits the notification to a client device executing a web application.

Step 1306 receives the notification and step 1308 provides a discernible notification for the user. Any suitable type of discernible notification can be provided. For example, in at least some embodiments the discernible notification can be a visually-discernible notification such as an overlay icon or a flashing web application icon. Alternately or additionally, the discernible notification can comprise an audibly-discernible notification such as a bell or buzzer.

Having considered various embodiments associated with jumplist integration, consider now a discussion of how websites can become "pinned" to a desktop feature, such as a task bar, in accordance with one or more embodiments.

Taskbar Pinning

There are various ways in which a web application can become integrated with a client desktop or task bar. In at least some embodiments, a web application can be integrated with the desktop through a drag and drop operation. Alternately or additionally, web applications can be integrated via a web browser's menu selections. Alternately or additionally, a web application can be integrated by an associated website itself. Each of these embodiments is discussed under its own heading below.

Integration through Drag and Drop Operations

Figure 14:
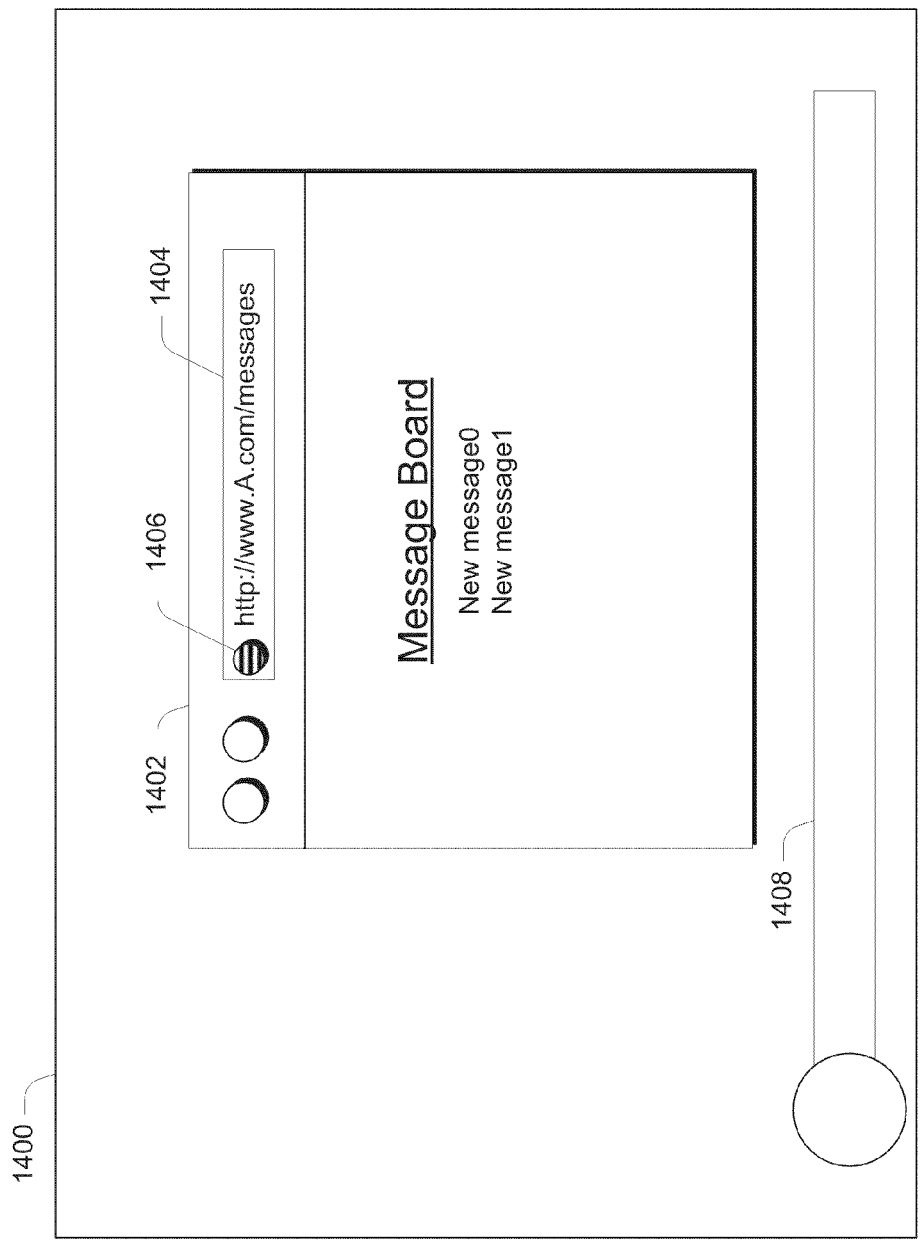
FIG. 14 illustrates a client desktop in accordance with one or more embodiments.

In one or more embodiments, a web application can be integrated with the desktop or task bar through a drag and drop operation. As an example, consider FIG. 14. There, a client desktop is shown generally at 1400. A web browser window 1402 includes an address bar 1404 with a web site URL displayed therein. In association with the URL, an icon, termed a "favicon" 1406, is shown. In addition, desktop 1400 includes a task bar 1408.

Figure 15:
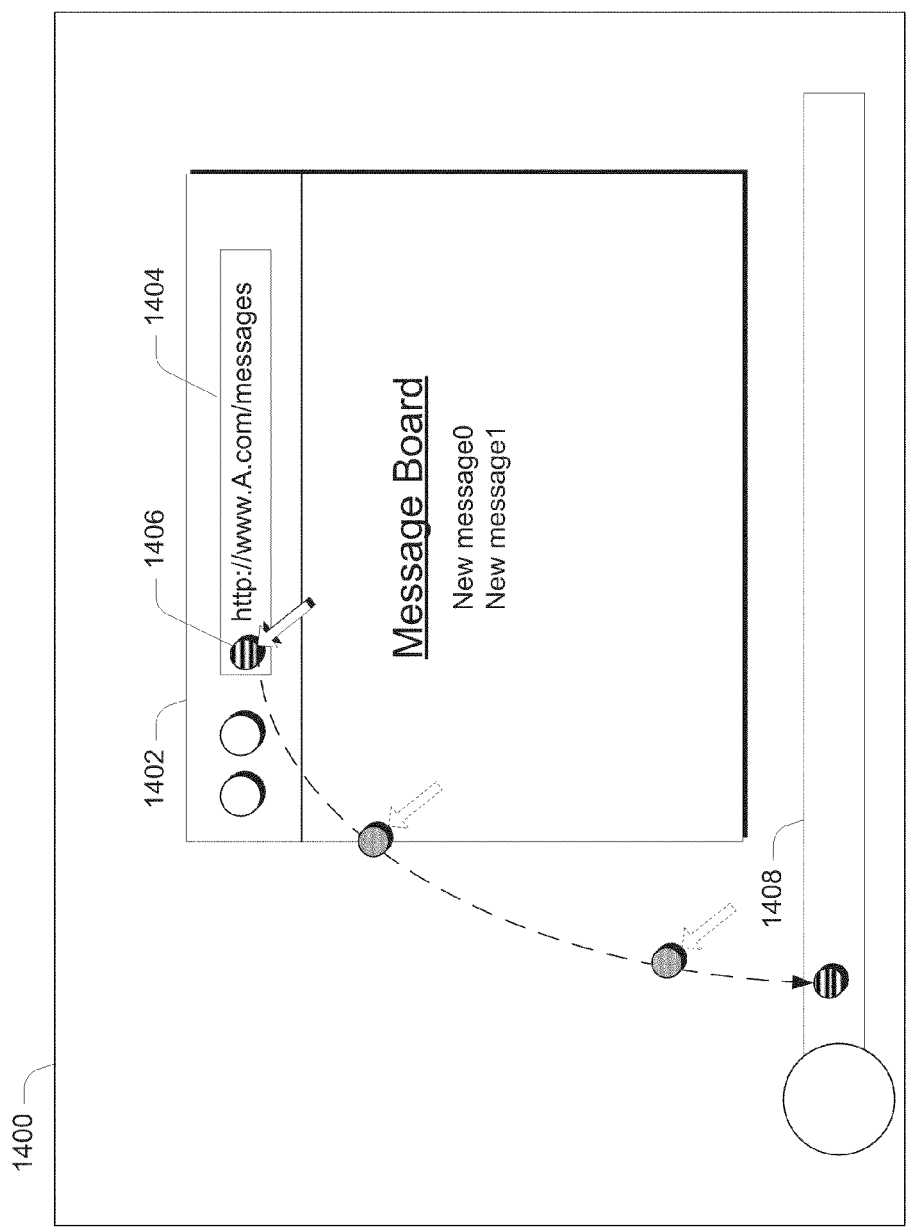
FIG. 15 diagrammatically illustrates a drag and a drop operation in accordance with one or more embodiments.

FIG. 15 diagrammatically illustrates a drag and a drop operation in accordance with one or more embodiments. In this example, a cursor has been placed over favicon 1406. By left clicking on the favicon and dragging it along to task bar 1408, the associated web application—in this case a message board application—can be pinned to the desktop's task bar 1408. The drag and drop operation starts the integration process of integrating the web application as described above, thus pinning it to the task bar.

In one or more implementations, if the webpage associated with the web application has a tab opened in the browser, after the favicon is dropped on the task bar, the associated tab can disappear from the browser's window. Alternately or additionally, the tab might not be removed but instead the content of the tab might be replaced with a "New Tab" page. In instances in which a single tab is open in a browser window, the browser window will disappear after the favicon is pinned to the task bar. At this point, the tab that contained in the original site can be removed before the browser closes but after the web application is pinned. In addition, in at least some embodiments, when the drag operation enters the task bar, a tool tip in the form of "Pin to Taskbar" can be presented to inform the user of the pinning functionality.

Further, the state of the website or web application that was pinned to the task bar can be migrated to a newly-displayed window when the web application is instantiated for the first time. This will allow the user to not have to re-enter credentials to the site in order to be able to use the application.

Having pinned a website or web application to the task bar and completed the installation process as described above, the web application can now be launched from the taskbar by simply clicking on the associated favicon.

Figure 16:
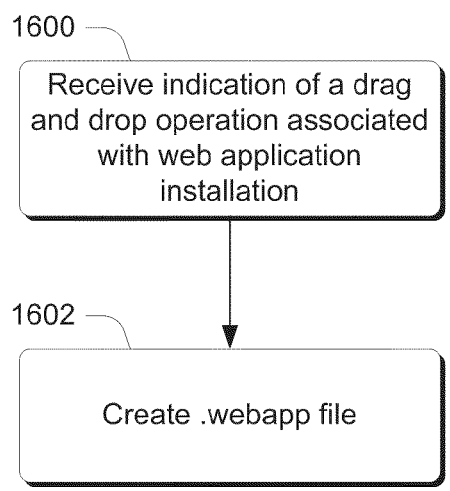
FIG. 16 is a flow diagram that describes steps in an installation method in accordance with one or more embodiments.

FIG. 16 is a flow diagram that describes steps in an installation method in accordance with one or more embodiments. The method can be performed by any suitable hardware, software, firmware, or combination thereof. In at least some embodiments, aspects of the method are performed by software executing on a client Step 1600 receives an indication of a drag and drop operation associated with web application installation. The step can be performed in any suitable way. In the embodiment described just above, the step is performed when a user drags and drops an icon such as a favicon, associated with a website, to indicate to the website a desire to integrate an associated web application with their desktop. For example, a user might drag and drop the favicon to the task bar, quick launch area or some other location on the desktop, such as the desktop canvass. Step 1602 creates a web application file responsive to the drag and drop operation. In the illustrated and described embodiment, the web application file that is initially created is an artifact or shell that does not yet contain information from the associated web site such as jumplist tasks, start URLs, favicons or other properties such as static jumplist tasks, an alternate start URL, alternate favicon and the like. These can be added later through new markup and/or JavaScript APIs as described above. It is to be appreciated and understood that techniques other than those that employ a JavaScript API can be utilized without departing from the spirit and scope of the claimed subject matter.

Integration through Browser Menu Selections

Figure 17:
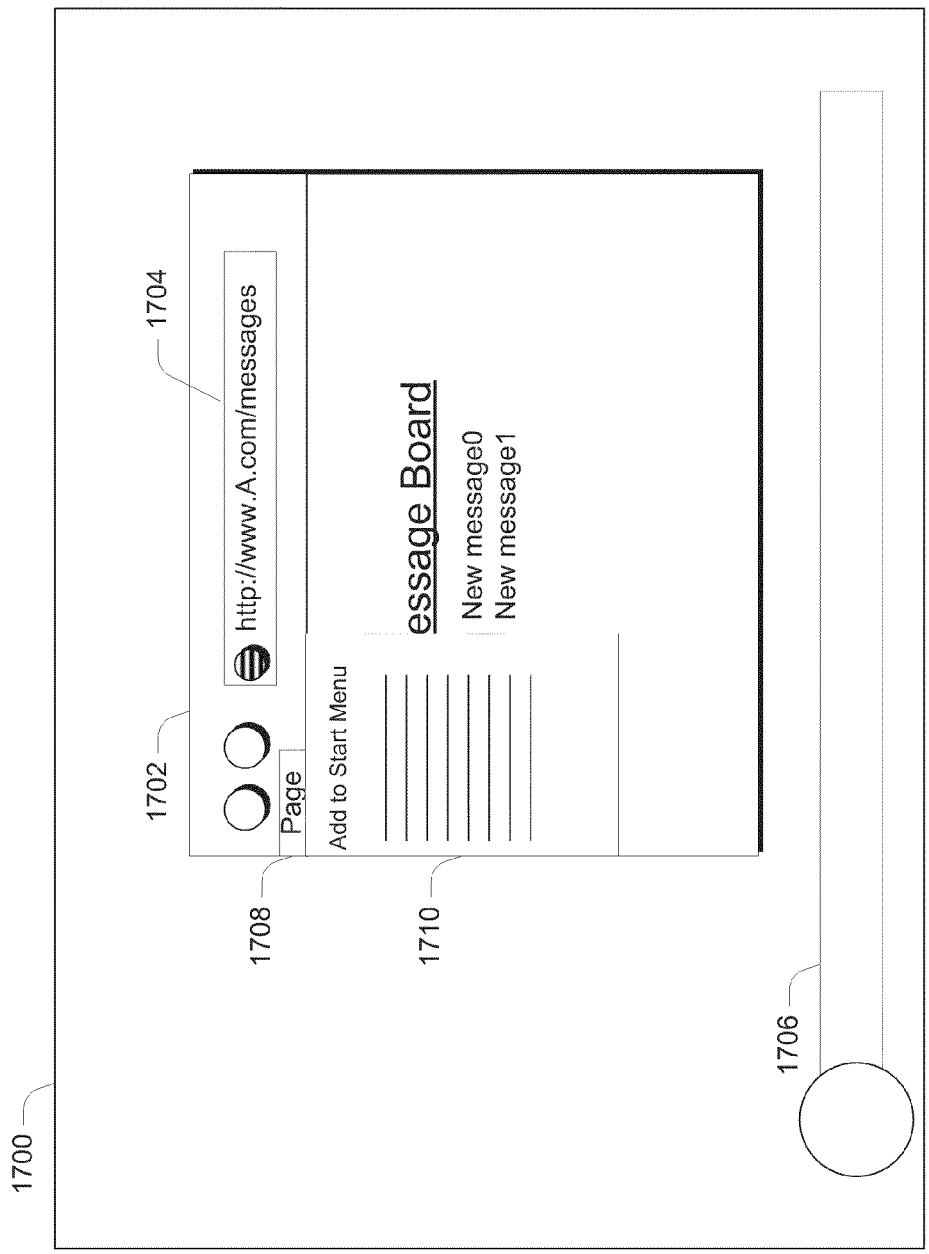
FIG. 17 illustrates a client desktop in accordance with one or more embodiments.

In one or more embodiments, web applications can be integrated via a web browser's menu selections. As an example, consider FIG. 17. There, a client desktop is shown generally at 1700. A web browser window 1702 includes an address bar 1704 with a URL displayed. In addition, desktop 1700 includes a task bar 1706. A browser menu item 1708 in the form of a page menu is shown. By dropping down the page menu to expose menu selections 1710, a menu item or selection "Add to Start Menu" is displayed. By selecting this option, a website or web application can be added to the desktop's start menu and the installation process can be initiated as described above. Alternately or additionally, an "Add to Task Bar" menu item or selection can be displayed to enable initiation of the installation process.

Figure 18:
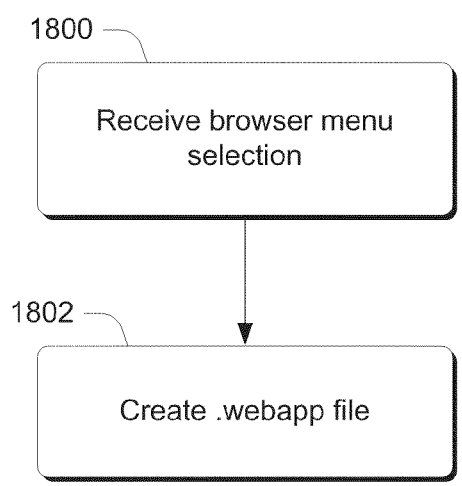
FIG. 18 is a flow diagram that describes steps in an installation method in accordance with one or more embodiments.

FIG. 18 is a flow diagram that describes steps in an installation method in accordance with one or more embodiments. The method can be performed by any suitable hardware, software, firmware, or combination thereof. In at least some embodiments, aspects of the method are performed by software executing on a client.

Step 1800 receives a browser menu selection. The step can be performed in any suitable way. In the embodiment described just above, this step is performed when a user navigates to a particular website, drops down a browser menu to expose menu selections, and then takes an action by selecting a menu item associated with initiating installation of a web application associated with the website.

Step 1802 creates a web application file responsive to receiving the browser menu selection. In the illustrated and described embodiment, the web application file that is initially created is an artifact or shell that does not yet contain information from the associated web site such as jumplist tasks, start URLs, favicons and the like. These can be added later through new markup and/or JavaScript APIs as described above. It is to be appreciated and understood that techniques other than those that employ a JavaScript API can be utilized without departing from the spirit and scope of the claimed subject matter.

Integration through Associated Website

In one or more embodiments, integration of a web application with a desktop can occur from a webpage. In these embodiments, a particular website can opt into integration activities by using code, such as JavaScript, to integrate the web application into the desktop. This allows the website to be in control of integration initiation instrumentalities.

Figure 19:
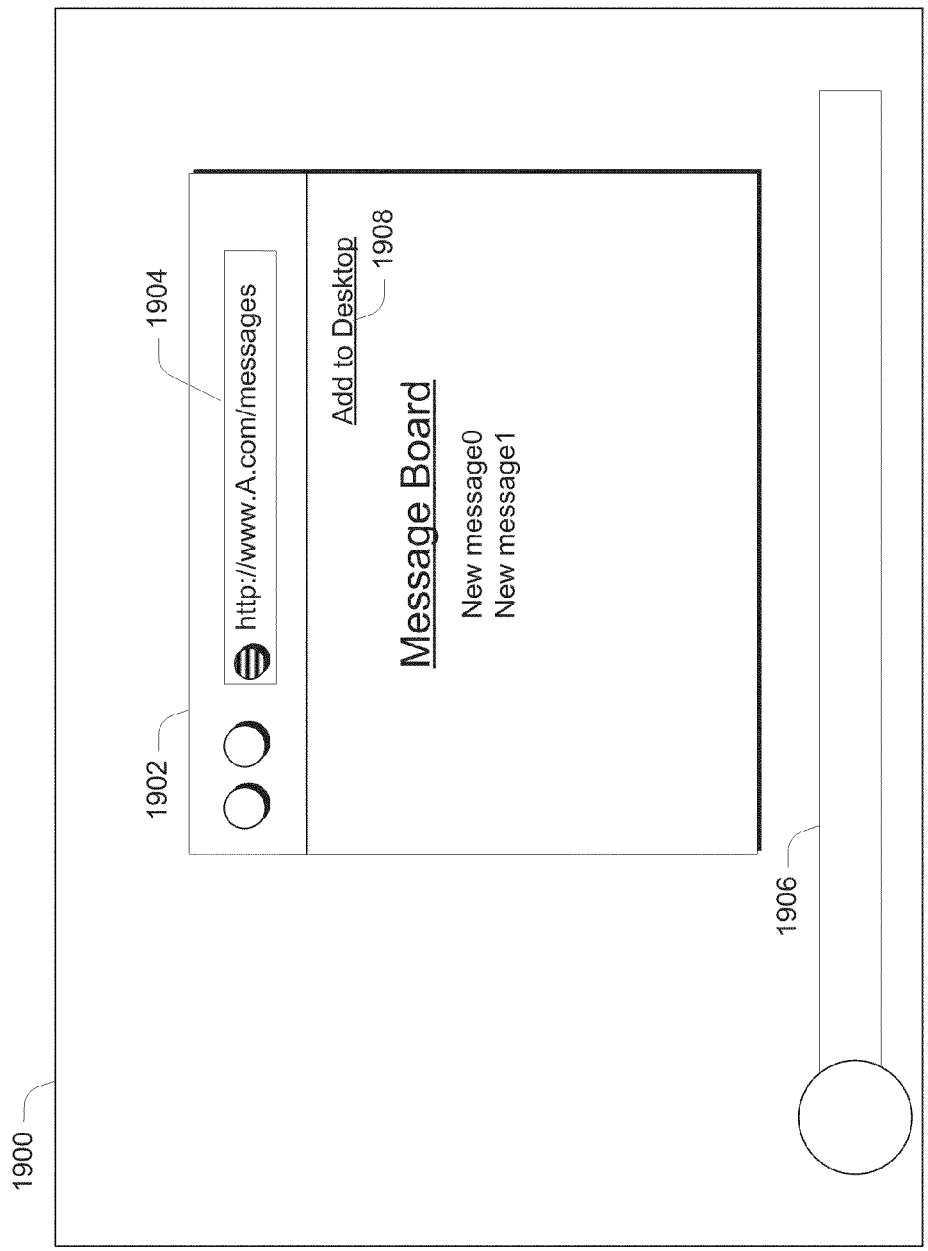
FIG. 19 illustrates a client desktop in accordance with one or more embodiments.

As an example, consider FIG. 19. There, a client desktop is shown generally at 1900. A web browser window 1902 includes an address bar 1904 with a URL displayed therein. In addition, desktop 1900 includes a task bar 1906. Further, a webpage displayed within browser window 1902 includes a link 1908 entitled "Add to Desktop". By clicking on this link, a user can initiate a web application installation process as described above.

In at least some embodiments, after link selection takes place, a modal confirmation dialog can be presented that explains the user action that the user is taking and where to access their newly-created shortcut. This confirmation dialog can present, to the user, the source URL of the page that is being presented. The URL that is displayed can contain the full path of the website. This can allow the user to verify that the website they wish to install is being served from the correct site. This can mitigate situations associated with malicious subdirectories.

In various implementations, the URL of the website that is to be integrated with the desktop is checked to confirm that it is on the same domain as the webpage that contains it. If not, an error can be displayed and the operation can fail. After the user confirms operation, the dialog can be removed and the web application window can be displayed with the correct URL.

Figure 20:
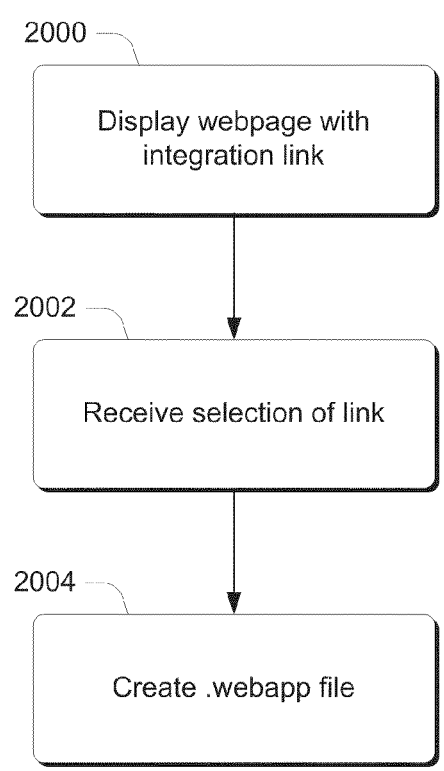
FIG. 20 is a flow diagram that describes steps in a method in accordance with one or more embodiments.

FIG. 20 is a flow diagram that describes steps in an installation method in accordance with one or more embodiments. The method can be performed by any suitable hardware, software, firmware, or combination thereof. In at least some embodiments, aspects of the method are performed by software executing on a client.

Step 2000 displays a webpage with an integration link. The step can be performed in any suitable way, an example of which is provided above. Step 2002 receives a selection of the integration link. Step 2004 creates a web application file responsive to receiving the link selection. In the illustrated and described embodiment, the web application file that is initially created is an artifact or shell that does not yet contain information from the associated web site such as jumplist tasks, start URLs, favicons and the like. These can be added later through new markup and/or JavaScript APIs as described above. It is to be appreciated and understood that techniques other than those that employ a JavaScript API can be utilized without departing from the spirit and scope of the claimed subject matter.

Figure 21:
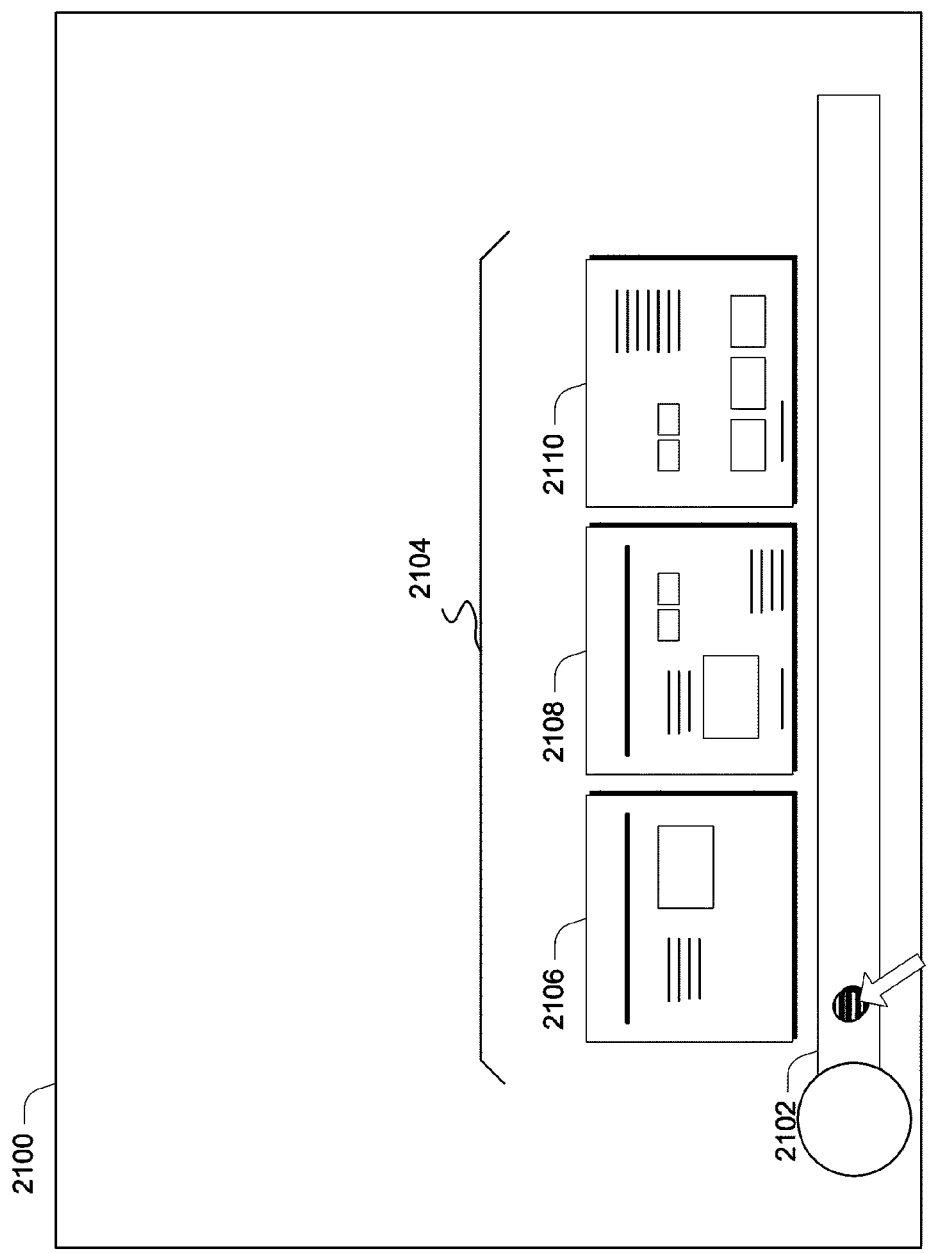
FIG. 21 illustrates a client desktop in accordance with one or more embodiments.

In at least some embodiments, a visual representation of multiple windows or tabs associated with a web application can be provided for the user. As an example, consider FIG. 21. There, a desktop 2100 includes a task bar 2102 having a web application icon pinned thereon. A cursor has been used to launch the web application by clicking on the icon. Assume, in this example, a user has navigated to multiple pages using the web application's starting page. The web application can enable a visualization that shows a collection 2104 of web pages to which the user has navigated. Specifically, in this example, collection 2104 includes a starting page 2106 for the web application, and subsequent pages 2108 and 2110 to which the user has navigated from the starting page.

Having considered various web application integration techniques, consider now a discussion of how user credentials can be associated with login sessions for a web application.

Associating Credentials and Login Sessions

Various embodiments enable one or more web applications that are associated with websites that utilize login or credential information to be integrated in a manner that preserves login or credential information across different instances of a web application.

When a browser navigates to a website that utilizes login or credential information, the login or credential information can be manually entered or retrieved from a credentials store. The credentials store can contain user login information such as, by way of example and not limitation, a username and password or a user's credentials for a particular URL. The same URL or website may have multiple entries, each associated with a different user. Similarly, the credentials store can contain user login information or credentials for multiple URLs.

In at least some embodiments, a web application associated with a website that a user is logged into can be integrated on the desktop and interacted with as described above. When such a web application is integrated, a process determines what website the web application is associated with, as well as the user who is logged onto the website. The process searches the credentials store for associated login information and/or credentials. The process can then create an association between the user, the created web application, and the relevant credentials.

Figure 22:
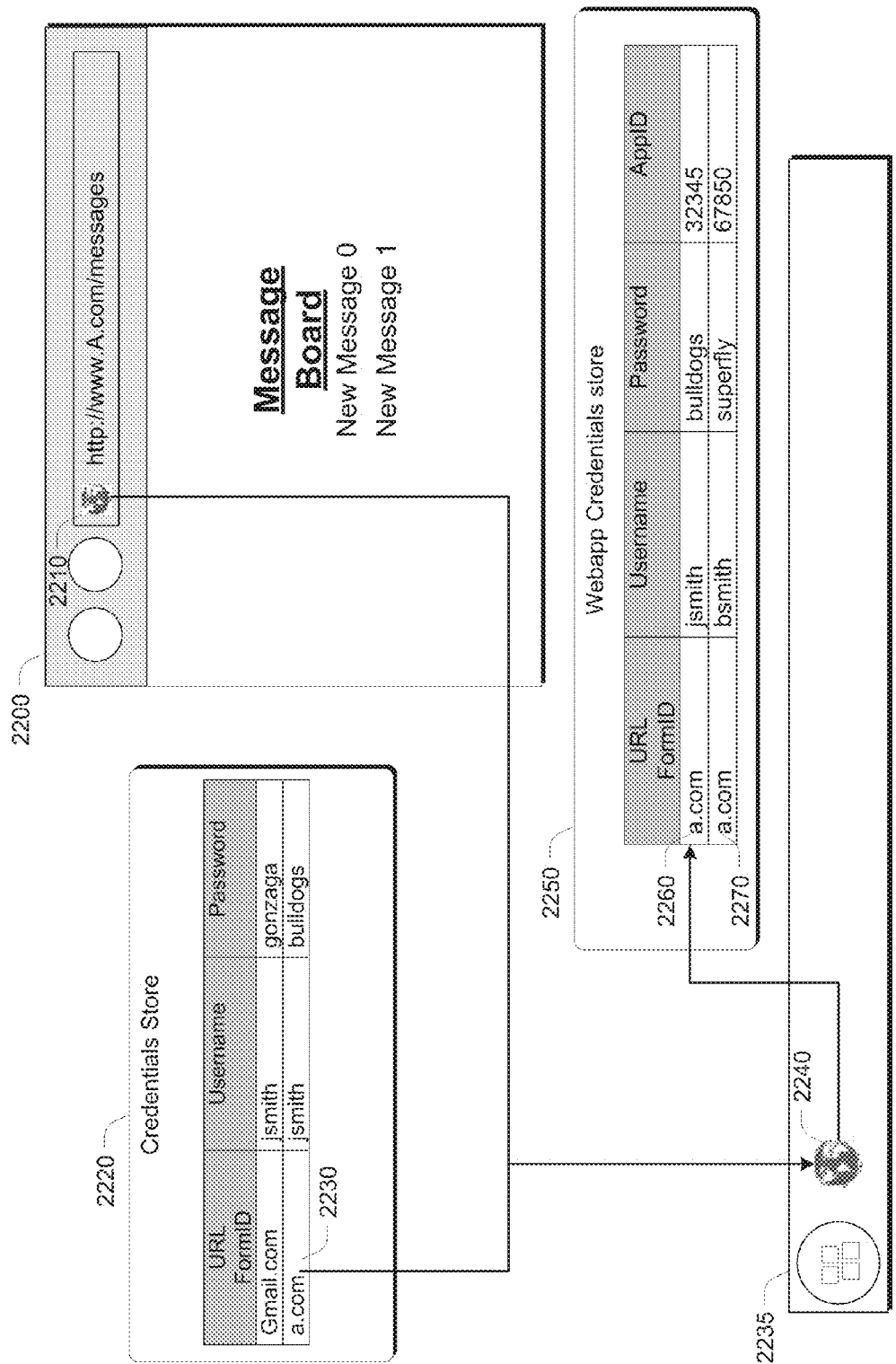
FIG. 22 illustrates a relationship between a browser displaying a website, a credentials store, an associated web application, and a web application credentials store, in accordance with one or more embodiments.

As an example, consider FIG. 22, which illustrates a relationship between a website, a credentials store and a web application in accordance with one or more embodiments. Browser 2200 displays a website that utilizes login information. In addition to displaying a URL, an icon 2210 is displayed which can be selected to facilitate the integration of a web application as described above. Credentials store 2220 includes entries that contain login information for multiple websites. One such entry is shown at 2230. Here, the entry includes a website URL, a user name, and a password. While FIG. 22 shows the login information as including a user name and password, it is to be appreciated and understood that other forms of login information or credentials can be employed.

In one or more embodiments, icon 2210 can be selected and dragged and dropped onto task bar 2235, as described above and shown by icon 2240. This procedure initiates the integration of the web application associated with the website. After the selection is received, a process determines which user is currently logged onto the web site and searches credentials store 2220 for associated credentials. It is to be appreciated and understood, however, that associated credentials can be determined and/or obtained in other ways without departing from the spirit of the claimed subject matter.

Upon obtaining the user's credentials and/or login information, an association is made between the credentials and the web application in a web application credentials store 2250. Web application credentials store 2250 can contain one or more entries containing data relevant to the association between websites, web applications and pertinent credentials.

For example, FIG. 22 illustrates an entry 2260 which is shown as containing login information pertaining to website "a.com" for user jsmith. In addition to the URL, username, and password information, entry 2260 also includes an Application ID or "AppID" which can be used to associate the web application with the corresponding credentials. Web application credentials store 2250 also contains a second entry 2270 for the same website "a.com" but a different user, bsmith. This mechanism allows for associating individual web applications from the same website with different users and their associated credentials.

While not illustrated in FIG. 22, various forms of user login information and/or credentials can be associated with a web application. For example, in one embodiment, an association can contain a pointer or reference back to information in credentials store 2220. In another embodiment, web application credentials store 2250 can include information copied from the credentials store. In yet another embodiment, credentials separate from, or in addition to, usernames and passwords can be associated with a web application. For example, biometric information might form the basis of an association that is created in the web application credentials store.

Having described the relationship between a website, a credentials store and a web application, consider now how a web application can be integrated for a website that employs associated credentials.

Creating and Launching a Web Application with Associated Credentials

Figure 23:
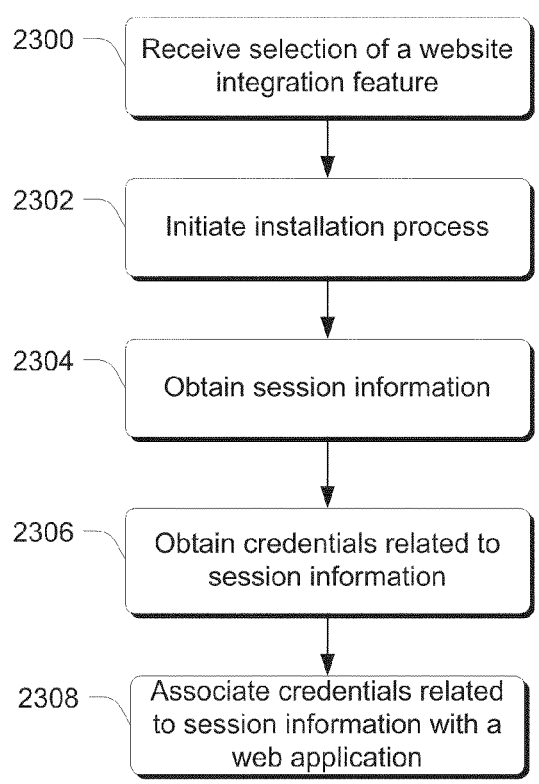
FIG. 23 is a flow diagram that describes steps in a method in accordance with one or more embodiments.

FIG. 23 illustrates a flow diagram that describes steps in a method in accordance with one or more embodiments. The method can be performed by any suitable hardware, software, firmware, or combination thereof. In at least some embodiments, aspects of the method are performed by software executing on a client.

Step 2300 receives a selection of a website integration feature. Examples of how this can be done are provided above. As described above, the website integration feature is associated with installation of a web application on a client's desktop. Responsive to receiving selection of the website integration feature, step 2302 initiates an installation process to install a web application on a client's desktop, as described above. Specifically, initiation of this process on the client can include creating the web application file as described above.

Step 2304 obtains session information associated with a current web session associated with the website. This step can be performed in any suitable way. For example, in one embodiment, session information can be obtained using a shared memory component between a browser rendering content associated with the website and the installation process. In another embodiment, a website can automatically forward session information after the website integration feature is selected. In yet another embodiment, session information can be stored by a browser and subsequently queried.

Responsive to obtaining session information, step 2306 obtains credentials related to the session information. In one embodiment, a credentials store can be queried for login and/or credentials related to a website into which the user is logged. For example, a credentials store can be queried for a username and password associated with the website and user of the current session. Step 2308 associates credentials and/or login information related to the session information with a web application. This step can be performed in any suitable way. For example, the credentials can be copied to a web application credentials store for future reference. Alternately or additionally, a pointer or reference to the credentials in a credentials store can be placed in the web application credentials store. An identification number can be generated based at least in part upon session information and/or credentials to create a unique ID for each instance of a web application and the related credentials and/or login information. This information can be added to the web application credentials store entry to associate the acquired credentials and/or login information with a web application. It is to be appreciated and understood, however, that any suitable technique can be employed to associate credentials with a web application without departing from the spirit and scope of the claimed subject matter.

As described above, a unique ID for each web application instance allows for multiple instances of web applications to be associated with the same URL or web site, with each instance being associated with different user credentials.

Figure 24:
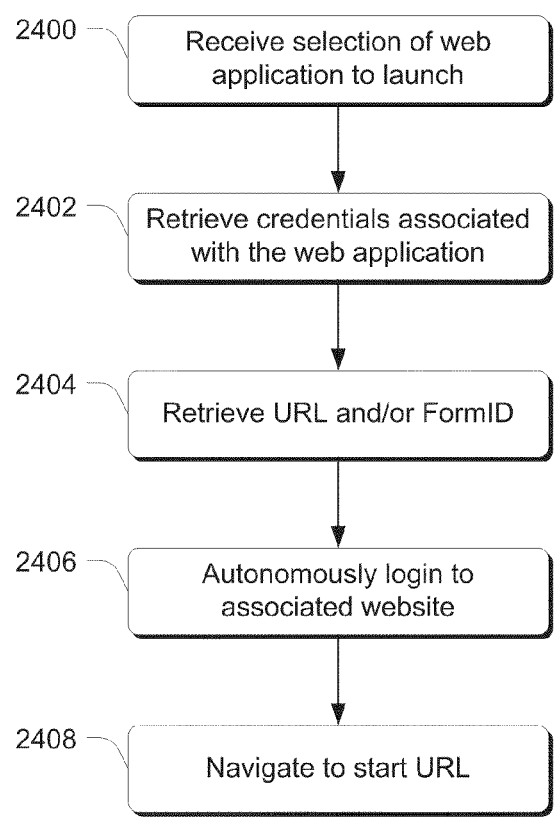
FIG. 24 is a flow diagram that describes steps in a method in accordance with one or more embodiments.

FIG. 24 is a flow diagram that describes steps in a method in accordance with one or more embodiments. The method can be performed by any suitable hardware, software, firmware, or combination thereof. In at least some embodiments, aspects of the method are performed by software executing on a client.

Step 2400 receives selection of a web application to launch. This step can be performed in any suitable way. For example, an icon selection can be made from a task bar on which the icon is pinned, as described above. Alternately or additionally, a selection from a desktop start menu or a system tool bar can be made. Upon receiving selection of the web application to launch, step 2402 retrieves credentials associated with the web application. For example, in one or more embodiments, an AppID can be used to reference a web application credentials store to retrieve login information for a user who is currently logged in. Step 2404 retrieves a URL and/or a FormID associated with the web application and related credentials. Upon acquiring the information described in steps 2402 and 2404, step 2406 autonomously logs into the associated website without user intervention. After logging into the website, step 2408 navigates to the start URL, as previously described above.

Having described how a web application associated with credentials is integrated and launched, consider now a discussion of multiple instances of web applications with associated credentials.

Multiple Instances of Web Applications with Associated Credentials

Figure 25:
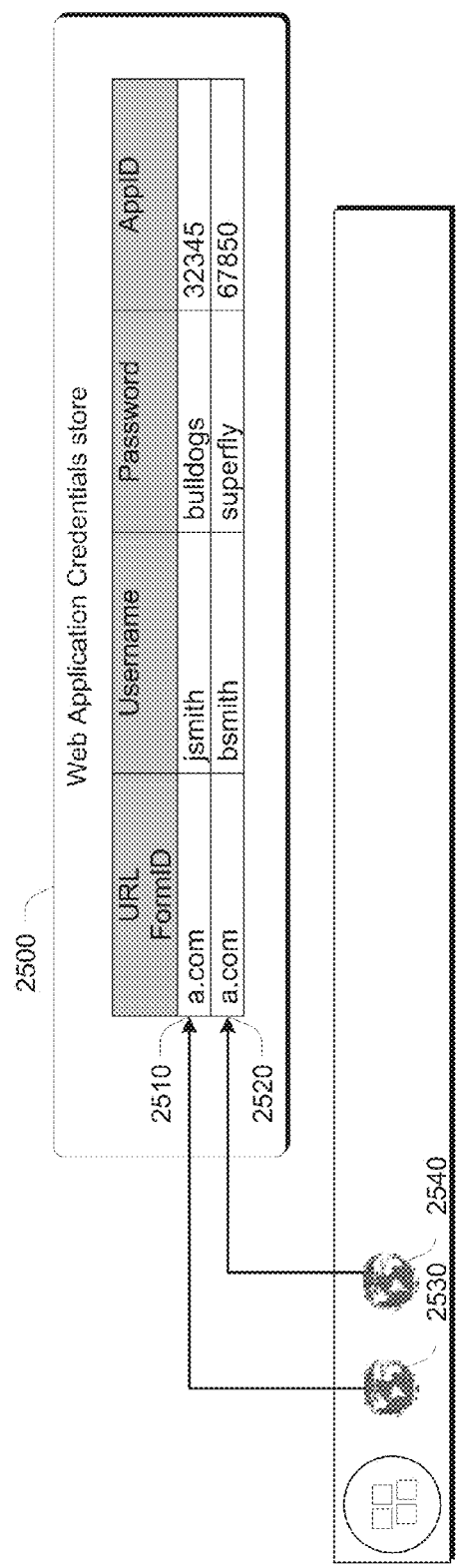
FIG. 25 illustrates an example of multiple web application instances in accordance with one or more embodiments.

FIG. 25 illustrates an example of multiple web application instances that are associated with credentials. Web application credentials store 2500 includes data pertaining to a web application and associated credentials for a website. Included in the web application credentials store 2500 are entries 2510 and 2520, each for a different user. As illustrated in FIG. 25, entry 2510 pertains to website "a.com", and contains additional information, such as user name jsmith and password bulldogs, which are used to log onto the associated website. Entry 2510 includes an AppID, which is used to associate the entry with web application 2530. Entry 2520 also pertains to website "a.com", but contains login information for user bsmith, and is associated with web application 2540. While FIG. 25 illustrates an entry to contain a URL/FormID, username, password, and AppID, it is to be appreciated and understood that different forms of associations and credential information can be used without departing from the spirit of the claimed subject matter. Thus, two or more data entries in the web application credentials store can contain data identifying different web applications that are integrated on the client's desktop and each have different user credentials that are associated with the same website.

In one or more embodiments, one or more web applications that are associated with the same web site can exist or be activated simultaneously. For example, a software module can be configured to enable a web application to be launched via a desktop tool bar and to use the associated credentials to automatically log the associated user into the website when the web application is launched. In addition to launching a single web application, the software module can be configured to enable a second web application to be launched using different user credentials for either the same website, or a different website when the second web application is selected to be launched.

For example, the two web applications 2530, 2540 of FIG. 25 are activated at the same time. As described above, each pertains to website "a.com", but has different credentials associated with them. As web application 2530 is selected and launched, it automatically logs onto website "a.com" using credentials associated with user jsmith. Similarly, when web application 2540 is selected and launched, it logs onto website "a.com" using credentials associated with user bsmith. Thus, multiple instances of web applications associated with the same website can be simultaneously activated and associated with different credentials.

Having described the notion of creating and launching a web application with associated credentials, consider now a discussion of web application task sessions.

Web Application Task Sessions

In one or more embodiments, task sessions can be created to enable state information associated with a web application to be saved to the system. State information can include, by way of example and not limitation, session cookies, JavaScript state, DOM state, form state, tab and window positioning, window sizes, URLs, history and the like.

Because state information associated with a particular task session is saved, a web application can be closed and later re-opened to restore or re-hydrate the state information for the web application. State information can be saved either automatically or through a manual selection process.

Figure 26:
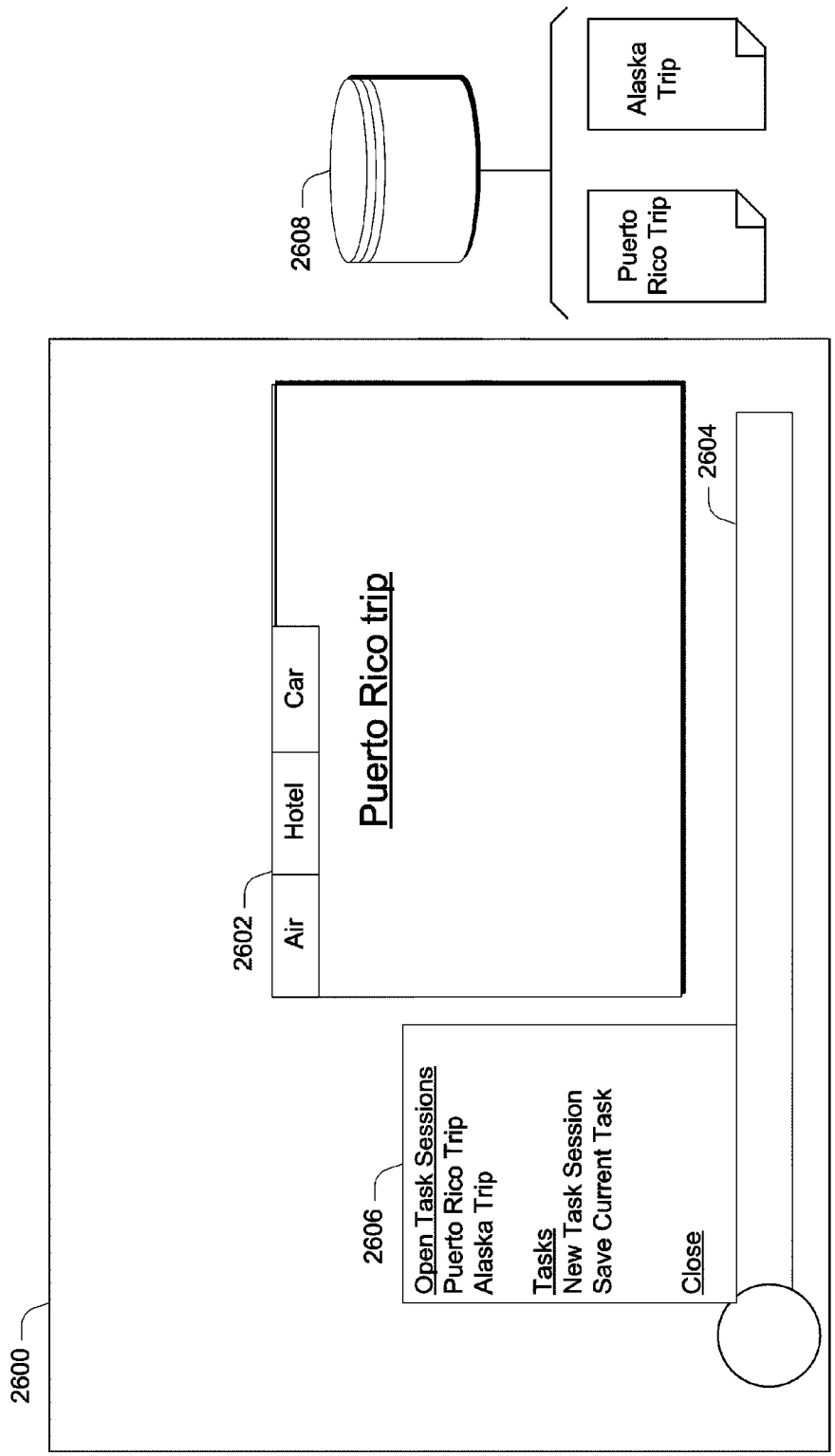
FIG. 26 illustrates a client desktop in accordance with one or more embodiments.

As an example, consider FIG. 26. There, a desktop 2600 includes a web application window 2602 that is being utilized to plan a trip. Desktop 2600 also includes a task bar 2604 and a jumplist 2606. A web application directory 2608 provides a storage facility that can be utilized to store task session state information. In the illustrated and described embodiment, the web application directory 2608 is created in the system's user space. In this example, the user has two task sessions that have been saved—one associated with a Puerto Rico trip and one associated with an Alaska trip.

In operation, when a user interacts with a web application, the user can elect, through any suitable instrumentality, to create and save a task session. In the illustrated example, jumplist 2606 has a menu item "Tasks" that includes two entries. The first entry "New Task Session" enables the user to create a new task session. The second entry "Save Current Task" enables the user to save the current task. By saving the current task, state information associated with the task is persisted to the web application directory 2608. A menu item entitled "Open Task Sessions" contains entries that enable a user to restore or re-hydrate previous task sessions that have been persisted to the web application directory 2608. Here there are the two previously-mentioned, previously-saved task sessions—Puerto Rico trip and Alaska trip.

As noted from the above example, multiple task sessions can be created and saved for individual web applications. When a task session is saved, an application ID associated with the web application can be saved with the task session. The application ID can then be used to determine which web application is to consume the information associated with the saved task session.

Any suitable techniques and approaches can be utilized to enable task sessions to be created and saved. In at least some embodiments, the system can leverage or otherwise utilize a crash recovery system associated with the system's web browser. In this instance, crash recovery functionality can be triggered when, for example, a user elects to save a current task or to create a new task session. The crash recovery functionality can create an "appdata" file that resides in the user's application data directory and which can be used to save the information associated with the task session. Specific operation of crash recovery systems will be understood by those of skill in the art. Accordingly, for the sake of brevity, such systems are not described herein.

Figure 27:
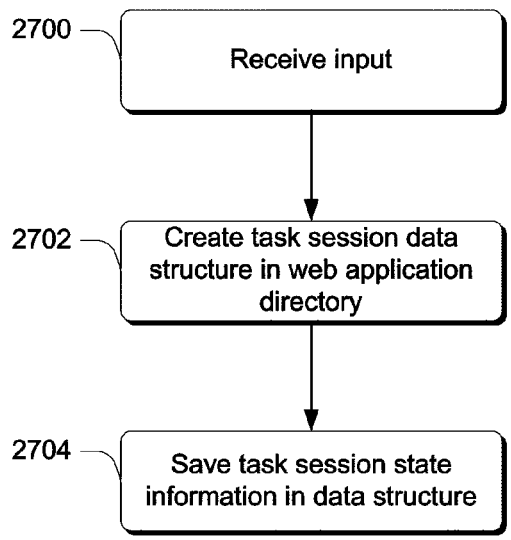
FIG. 27 is a flow diagram that describes steps in a method in accordance with one or more embodiments.

FIG. 27 is a flow diagram that describes steps in a method for saving task session state information in accordance with one or more embodiments. The steps can be executed in connection with any suitable hardware, software, firmware, or combination thereof. In at least some embodiments, the method can be performed by software executing on a client in association with software executing on a server.

Step 2700 receives input associated with saving task session state information. Any suitable input can be received. For example, the received input can comprise input received from a user. Alternately or additionally, the input can comprise some type of automatic, programmatic input. In at least some embodiments, the user input can be received via a jumplist. Alternately or additionally, the user input can be received via a shortcut. In the illustrated and described embodiment, the user input indicates that a user wishes to save task session state information associated with a web application. Step 2702 creates or otherwise accesses a task session data structure in a web application directory. The task session data structure is utilized to save task session state information. Step 2704 saves task session state information in the data structure. This step can be performed in any suitable way. For example, this step can be performed when a user elects to save the task session state information. Alternately or additionally, this step can be performed periodically during a user's interaction with the web application. In at least some embodiments, steps 2702 and 2704 can be performed by utilizing a web browser's crash recovery system. It is to be appreciated and understood, however, that other techniques can be utilized without departing from the spirit and scope of the claimed subject matter.

Figure 28:
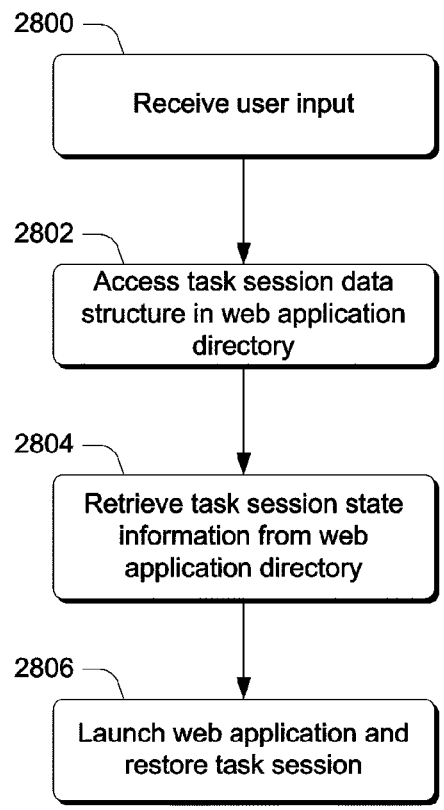
FIG. 28 is a flow diagram that describes steps in a method in accordance with one or more embodiments.

FIG. 28 is a flow diagram that describes steps in a method for restoring a task session whose state information has been saved, in accordance with one or more embodiments. The steps can be executed in connection with any suitable hardware, software, firmware, or combination thereof. In at least some embodiments, the method can be performed by software executing on a client in association with software executing on a server.

Step 2800 receives user input associated with restoring a task session whose state information was previously saved. Step 2802 accesses a task session data structure in a web application directory. As noted above, the task session's state information is saved in the task session data structure. Step 2804 retrieves the task session state information from the web application directory. Step 2806 launches an associated web application and restores the task session using the task session state information retrieved from the web application directory.

Having described the notion of saving and re-using task session state information, consider now how transitions can be performed between a web application and a browser.

Transitioning Between a Web Application and a Browser

In one or more embodiments, a web application can transition to a browser experience to be able to leverage browser capabilities that might not be provided by a web application mode browser that enables the web application. Recall that this is because in some embodiments, the web application mode browser is a pared-down or chrome-less browser to enable developers to provide a more site-specific experience. Such other capabilities that are excluded from the web application mode browser can include, for example, favorites, tool bars, and/or other add-ons.

In at least some embodiments, content and state associated with individual tabs can be migrated from a web application to the web browser. Alternately or additionally, content and state associated with multiple tabs and/or the whole content and state of the web application can be migrated from the web application to the web browser. Alternately or additionally, sessions associated with individual tabs can be migrated from the web application to the browser.

Figure 29:
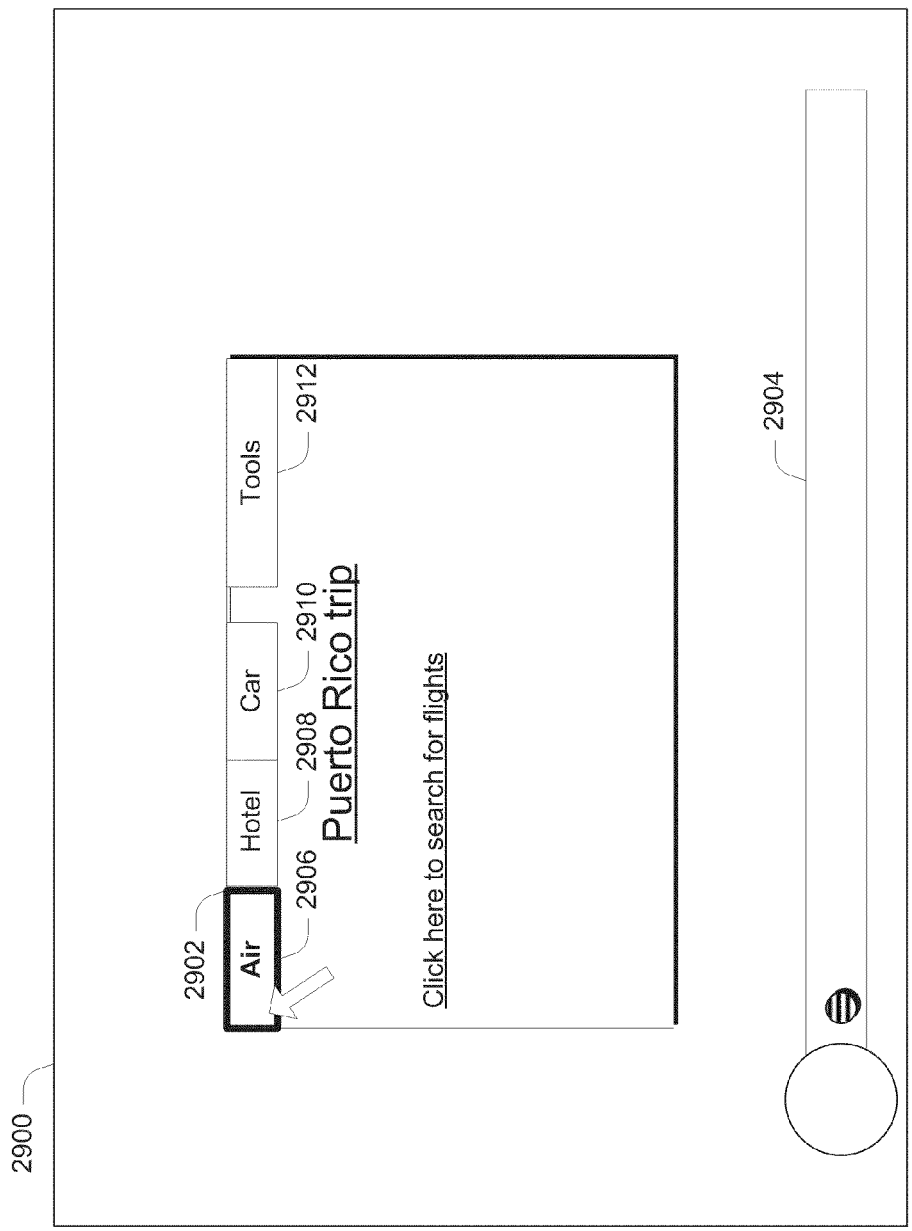
FIG. 29 illustrates a client desktop in accordance with one or more embodiments.

Consider a situation in which a user has started a web application from their desktop, has navigated within it, and opens one or more links in a new tab. As an example, consider FIG. 29. There, a desktop 2900 includes a web application window 2902 comprising part of a web application that is being utilized to plan a trip. Desktop 2900 also includes a task bar 2904 from which the web application was launched, as by clicking on an associated icon that has been pinned to the task bar. The web application window 2902 includes three tabs 2906, 2908, and 2910. In this instance, the user has selected tab 2906 and has a link "Click here to search for flights" that the user can open.

Assume now that the user clicks on the associated link to open it and, upon opening the link, decides that she would like to create a favorites item for the website that is displayed in tab 2906. In this instance, the user can open a tool menu 2912, or use some other user interface instrumentality, and select an option to open the tab's contents in an associated web browser. As an example, consider FIG. 30 which uses like numbers from FIG. 29.

There, tool menu 2912 has been opened to expose its contents 3000. In this example, two selections are available for the user—"Open Tab in Browser . . . " and "Open WebApp Content in Browser . . . ". The first selection enables a user to open the content of a selected tab in a web browser. When the selected tab is opened in the web browser, the tab's content and state are migrated to the web browser. The web browser can be one that has an open instance or, alternatively, one that is launched. The second selection enables the user to open the whole content of the web application in the web browser. When this is done, the web application's content and state are migrated to the web browser.

Any suitable techniques can be utilized to migrate content and state from a web application tab or web application to the web browser. In at least some embodiments, migration occurs through the use of the web browser's crash recovery system, such as that described above. Specifically, when a user indicates a desire to migrate content and state from a web application to a web browser, content and state can be written to the system's disk, e.g. by writing an appdata file that includes the relevant data that is to be migrated.

In addition, in at least some instances, shared memory can be utilized to migrate information or data that is not typically utilized by the web browser's crash recovery system. For example, data such as credentials and session cookies can be stored in shared memory and the shared memory can be utilized to enable such data to be used by the web browser.

Once the user selects a particular option displayed in the tool menu 2912, the information or data can be migrated to a current or new instance of a web browser, and the associated tab in the web application window 2902 can be closed. In one or more embodiments, if the tab from which the information or data is being migrated is the only tab open in the web application, the web application can be closed after the migration is complete.

The above-described approach works well when the web application and the web browser execute in different processes across a process boundary. That is, the migration using the crash recovery system and the shared memory is well-suited for crossing process boundaries. In some instances, however, process boundaries need not necessarily be crossed. Rather, the web application and subsequent web browser functionality can be exposed from within the same process. Specifically, in this instance, a web browser user interface can be instantiated and used, in connection with web application window 2902, and functionality that is not available through the web application mode browser can be turned on and made accessible through the web browser user interface. In operation, one way of implementing this is as follows. The web application first generates some crash recovery files. A new browser is initiated and loads crash recovery information from the crash recovery files. This information is then used to configure the state of the new browser. When the user works within the new browser, he or she will have access to all of the browser functionality via the browser's standard user interface.

Figure 30:
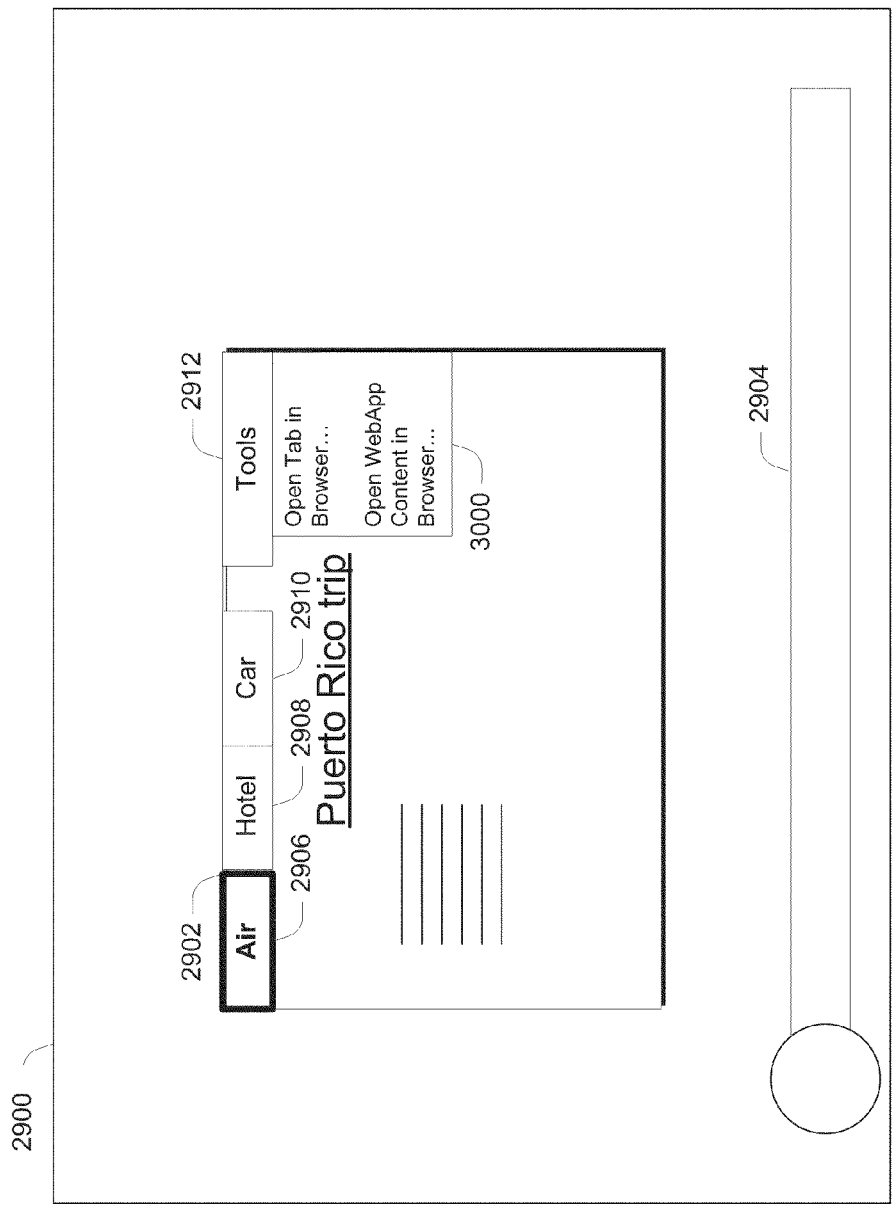
FIG. 30 illustrates a client desktop in accordance with one or more embodiments.
Figure 31:
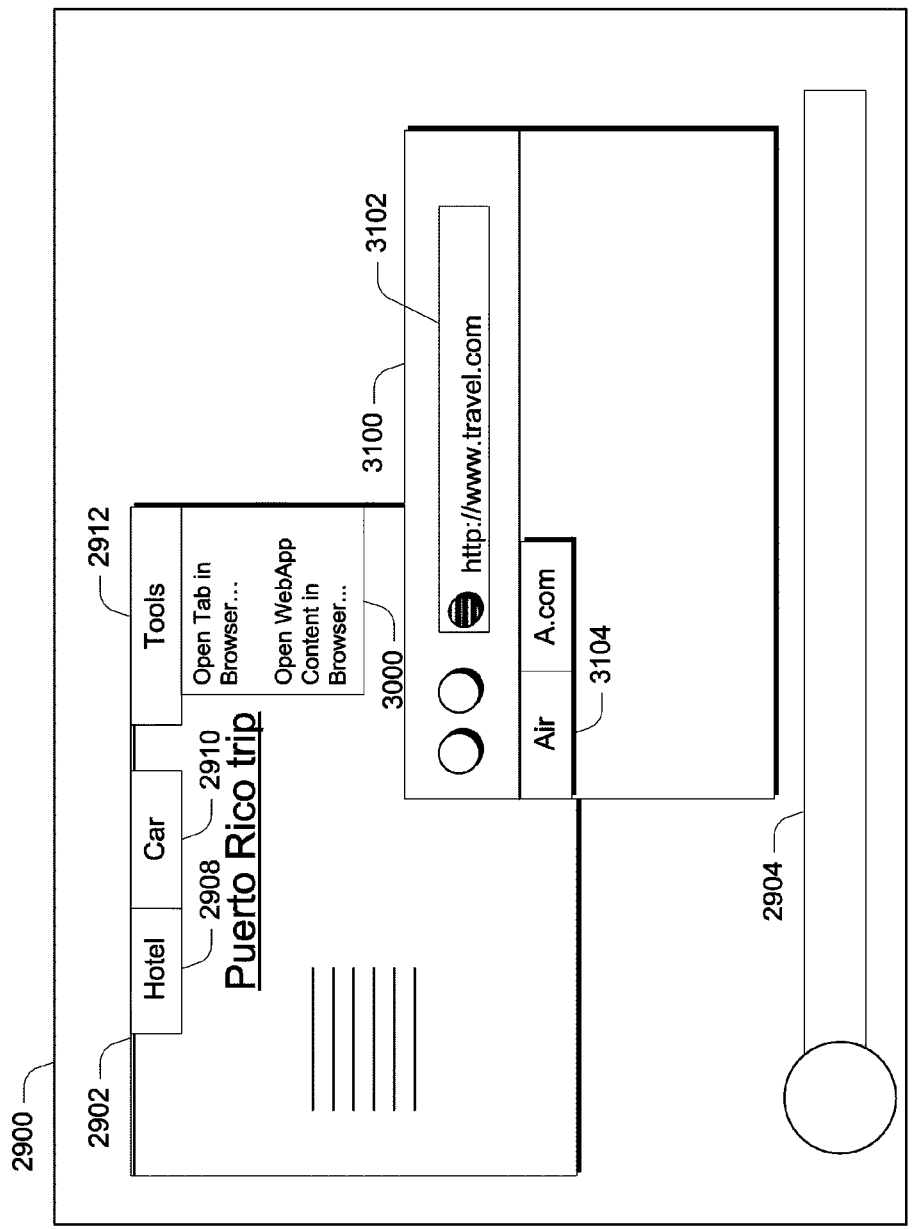
FIG. 31 illustrates a client desktop in accordance with one or more embodiments.

FIG. 31 illustrates an embodiment in which the user has elected to migrate content and state associated with a tab to a new browser instance. Like numbers from the FIG. 29 example have been utilized. Here, assume that a user has selected the "Open Tab in Browser" menu selection for tab 2906 (FIG. 30). Responsively, that tab's content and state are migrated to a new instance of a web browser whose associated user interface window is shown at 3100. User interface window 3100 includes an address bar 3102 and a tab 3104 associated with the tab that has been migrated from the web application. Notice in this example, that tab 2906 (FIG. 30) has been closed in the web application window 2902 but because multiple tabs are open, the web application remains open.

FIG. 32 is a flow diagram that describes steps in a method in accordance with one or more embodiments. The steps can be executed in connection with any suitable hardware, software, firmware, or combination thereof. In at least some embodiments, the method can be performed by software executing on a client in association with software executing on a server.

Step 3200 receives user input associated with migrating web application content and/or state to a web browser. Any suitable input can be received. For example, in at least some embodiments, input can be received through a tool menu that is exposed by the web application. Step 3202 migrates web application content and/or state to the web browser. Any suitable techniques can be utilized to migrate the web application content and/or state. In addition, content and/or state at any suitable level of granularity can be migrated. For example, content and/or state associated with individual tabs or multiple tabs of the web application can be migrated. Alternately or additionally, the entire content of the web application can be migrated. Further, in at least embodiments migration can occur across process boundaries. Alternately or additionally, migration can occur within the same process.

FIG. 33 is a flow diagram that describes steps in a method in accordance with one or more embodiments. The steps can be executed in connection with any suitable hardware, software, firmware, or combination thereof. In at least some embodiments, the method can be performed by software executing on a client in association with software executing on a server.

Step 3300 receives user input associated with migrating web application content and/or state to a web browser. Any suitable input can be received. For example, in at least some embodiments, input can be received through a tool menu that is exposed by the web application. Step 3302 instantiates a web browser user interface. Step 3304 exposes functionality using the web browser user interface. Exposing the functionality includes enabling interaction with the web application content through the web browser user interface. In at least some embodiments, the exposed functionality includes functionality that is not available through the web application or the web application mode browser and which can be used to interact with the web application content. Examples of such functionality are provided above. The method of FIG. 33 can be useful in situations where migration of web application content and/or state occurs within the same process.

Figure 34:
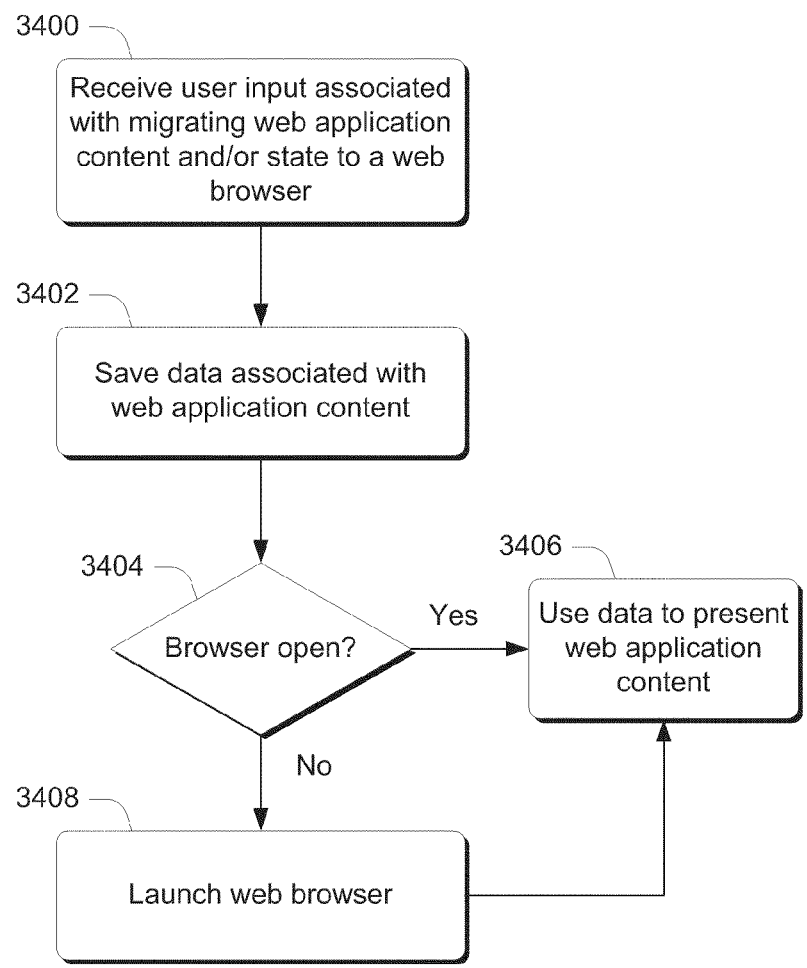
FIG. 34 is a flow diagram that describes steps in a method in accordance with one or more embodiments.

FIG. 34 is a flow diagram that describes steps in a method in accordance with one or more embodiments. The steps can be executed in connection with any suitable hardware, software, firmware, or combination thereof. In at least some embodiments, the method can be performed by software executing on a client in association with software executing on a server.

Step 3400 receives user input associated with migrating web application content and/or state to a web browser. Any suitable input can be received. For example, in at least some embodiments, input can be received through a tool menu that is exposed by the web application. Step 3402 saves data associated with the web application content. This step can be performed in any suitable way. For example, in at least some embodiments, at least some of the data can be written to the system's disk. Any suitable techniques can be utilized to write the data to the system's disk. For example, in at least some embodiments, a web browser's crash recovery system can be utilized to write the data to the system's disk. Further, in at least some embodiments, step 3402 can be performed by using shared memory that is shared between the web application and a web browser.

Step 3404 ascertains whether a web browser is open. If a web browser is open, then step 3406 uses the saved data to present the web application content in the web browser. If, on the other hand, the web browser is not open, step 3408 launches the web browser and returns to step 3406 to use the saved data to present the web application content.

Creating a Transient Web Application from a Browser

Various embodiments enable creation of one or more so-called transient web applications. In at least some embodiments, a transient web application can be created without pinning the transient web application to a taskbar or otherwise integrating the transient web application's associated files or indicia to a client's desktop as described above. For example, the transient web application may not have any user interface instrumentality integrated on the client's desktop that provides a way to enable it to be launched or re-launched, such as a shortcut on a start menu, a shortcut icon on the client's taskbar, and the like. In such instances, however, a user can launch the transient web application from its associated web site and can have access to the same functionality provided by the web application had it been installed or integrated as described above. After using the transient web application, it can then be closed by the user. In at least some embodiments, once a transient web application has been closed, a user no longer has access to that particular instance of the web application, thus rendering the transient web application un-relaunchable from the client's desktop tool bar or start menu. One way to do this is to delete the files or processes that were created for the web application when the user initially launched it from the associated web site. In some embodiments, a transient web application can be converted to an installed web application, thus providing future access to the web application from the client's desktop.

Figure 35:
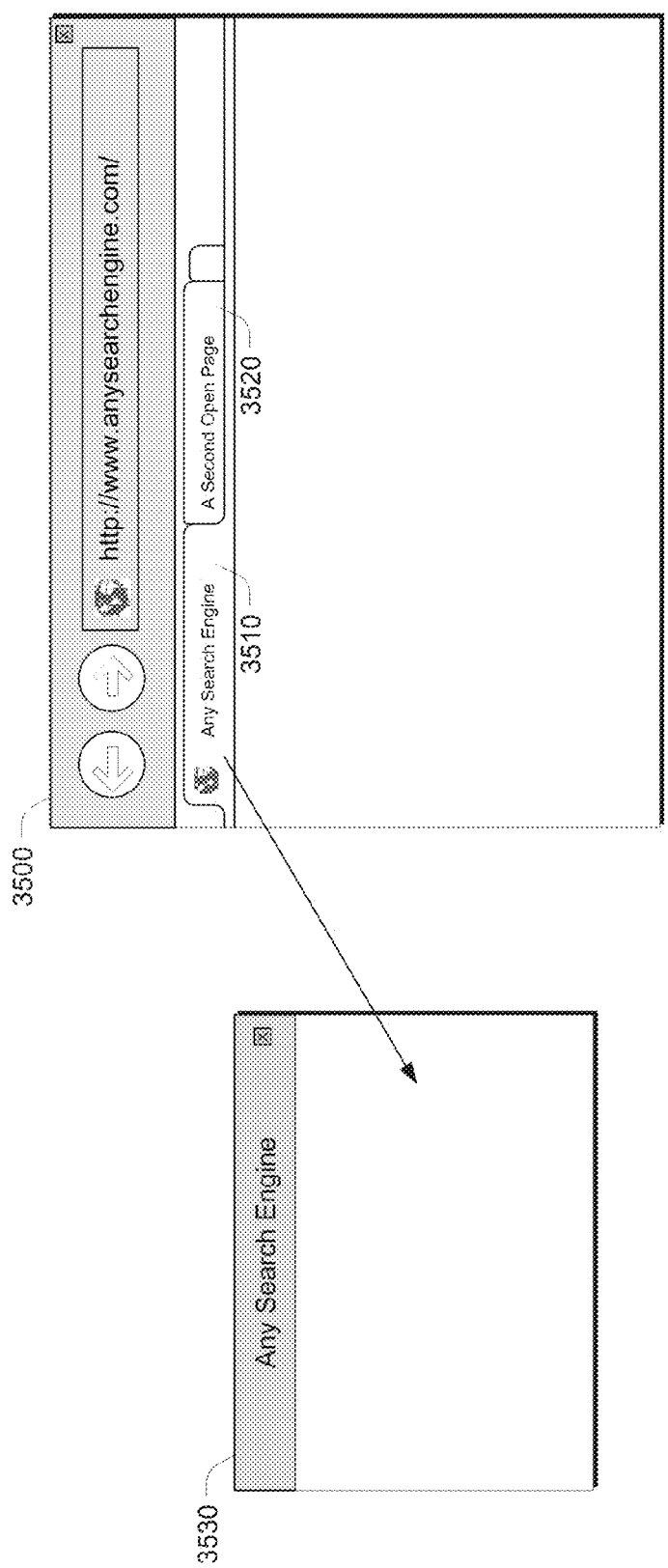
FIG. 35 illustrates a relationship between a web application and a browser in accordance with one or more embodiments.

As an example, consider FIG. 35, which illustrates a relationship between a transient web application and a browser. Here, browser 3500 enables access to multiple web pages through a tabbed system, where tab 3510 is associated with web site "Any Search Page" and tab 3520 is associated with "A Second Open Page". In one or more embodiments, a transient web application can be created from open web pages. In FIG. 35, a transient web application 3530 is generated or created by a user selecting tab 3510 and dragging and dropping the selection outside of browser 3500 on the desktop. When this happens, transient web application files can be created in a temporary location.

It is to be appreciated and understood, however, that transient web applications can be generated in other ways without departing from the spirit and scope of the claimed subject matter. For example, browser 3500 can have a pull down menu to facilitate selection of a web page and subsequent generation of an associated transient web application.

In the context of this document, transient web applications are web applications that are not installed on a client's system in the way that has been described above in this document. However, web sites can still execute and provide access to the same functionality in a transient web application that can be executed in an installed web application. For example, a web site can modify a transient web application's independent jumplist, set and clear overlay icons, and the like. Alternately or additionally, a transient web application can support the same behavior as an installed web application, such as providing independent collections of tabs or windows that are opened from within the transient web application, as described above.

Figures 36, 37:
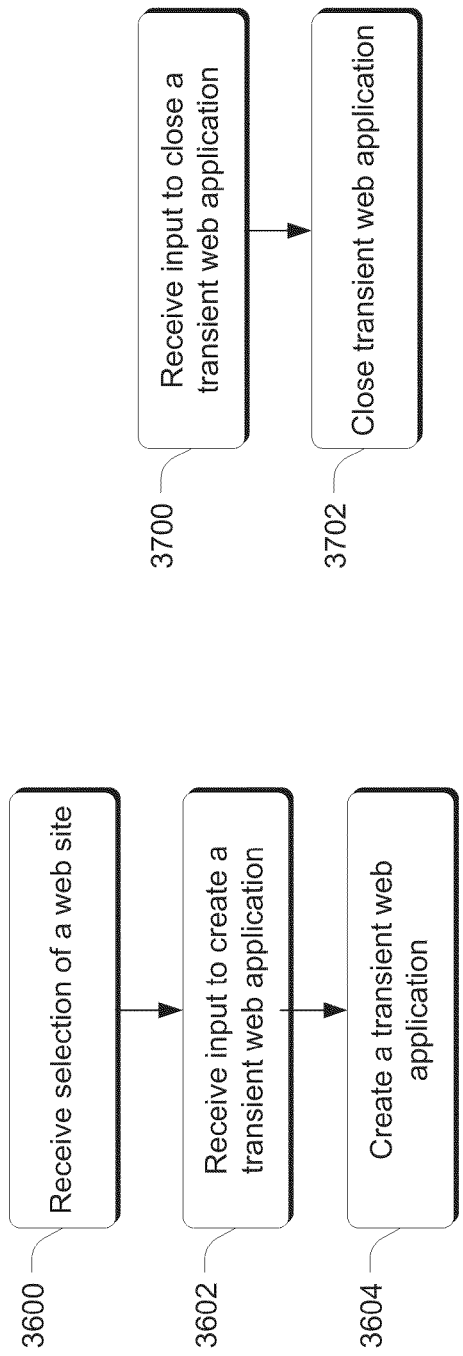
FIG. 36 is a flow diagram that describes steps in a method in accordance with one or more embodiments.
FIG. 37 is a flow diagram that describes steps in a method in accordance with one or more embodiments.

FIG. 36 illustrates a flow diagram that describes steps in a method in accordance with one or more embodiments. The method can be implemented in connection with any suitable hardware, software, firmware, or combination thereof. In at least some embodiments, aspects of the method can be implemented by a suitably configured web browser and/or a software module on a client device, such as in FIG. 1.

Step 3600 receives selection of a web site from which a web application can be acquired. This can be accomplished in any suitable way, such as through selection of a tab on a tabbed web browser, through a pull-down menu, and the like. Upon receiving selection of a web site, step 3602 receives input to create a web application as a transient web application on a client device. In one or more embodiments, this can include receiving a message or call containing a request or other information that can be used to generate a web application. In other embodiments, this can include receiving input generated from a user dragging and dropping some indicia associated with a web site. Step 3604 creates a transient web application that is associated with the selected web site. In some embodiments, creating a transient web application generates web application files and/or processes without integrating them or any associated indicia on a client's desktop or start menu. For example, the associated files can be saved in a temporary file location that is different from locations in which integrated web application files are placed. In addition, in at least some embodiments, creation of the transient web application can include transferring the web site's state from the browser to the transient web application.

FIG. 37 illustrates a flow diagram that describes steps in a method in accordance with one or more embodiments. The method can be implemented in connection with any suitable hardware, software, firmware, or combination thereof. In at least some embodiments, aspects of the method can be implemented by a suitably configured web browser and/or a software module, such as in FIG. 1.

Step 3700 receives input to close a transient web application. This step can be performed in any suitable way. For example, in one embodiment, this can include receiving input from a user selecting a close button on an open transient web application. In another embodiment, this can include receiving input based on a user selecting a close option on a transient web application pull-down menu. Upon receipt of the input to close a transient web application, step 3702 closes the transient web application. Closing a transient web application can include deleting or removing the transient web application's associated files and processes. Thus, upon closing the transient web application, a user no longer has access to its functionality without either accessing it again as described above, or installing it as a non-transient web application, described just below.

Having described creation and deletion of a transient web application, consider now how a transient web application can be converted into a pinned or installed web application in accordance with one or more embodiments.

Converting a Transient Web Application to an Installed Web Application

In one or more embodiments, a transient web application can be converted to an installed or integrated web application to allow for persistent access after the web application has been closed. Once converted, the transient web application can be considered as a non-transient web application.

Figure 38:
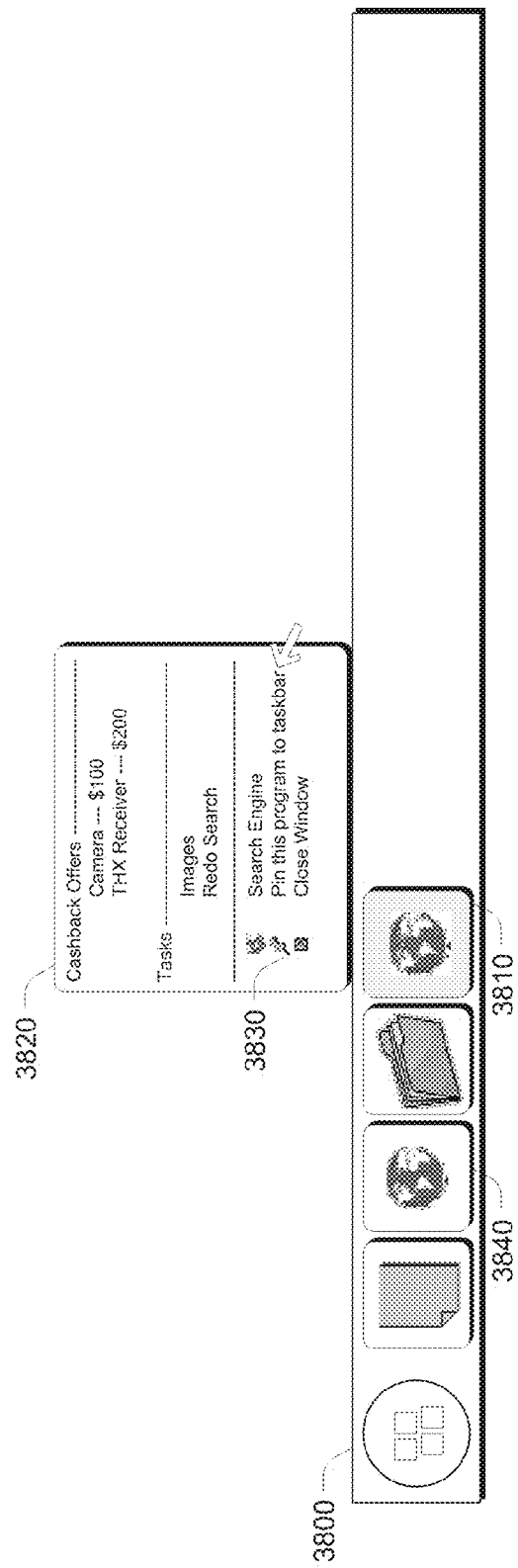
FIG. 38 illustrates an example of a transient web application in accordance with one or more embodiments.

FIG. 38 illustrates a transient web application that includes a jumplist. Taskbar 3800 shows multiple programs that are open and running on a client device. Transient web application 3810 is a web application that originated from program 3840. Associated with transient web application 3810 is a jumplist 3820. As in the case of an installed or integrated web application, jumplist 3820 has all the potential functionality associated with an installed web application. In addition, jumplist 3820 contains item 3830 entitled "Pin this program to taskbar". Selecting this option pins the web application to the client's taskbar, thus installing it and the associated user interface instrumentality on the client's desktop as described above. This enables the now non-transient web application to be re-launched from the desktop. It is to be appreciated and understood, however, that any suitable technique can be employed to convert a transient web application to a non-transient web application without departing from the spirit and scope of the claimed subject matter. For example, in some embodiments, a transient web application can be added to a start menu of a client's desktop to integrate and install the web application. In another embodiment, a transient web application may have a pull down menu with an option to initiate the installation process. Needless to say, numerous ways can be utilized to convert a transient web application into a non-transient web application.

Web Application Super Home Button

When interacting with a web application, it is possible for a user to navigate to a domain other than one directly associated with the website with which the web application is associated. For example, a user may initiate an e-mail web application and, by following external links, arrive at another site such as a news, shopping, or entertainment site.

In one or more embodiments, a web application home button is provided as part of the user interface experience. The web application home button serves the couple purposes. First, the web application home button indicates that the purpose of a particular web application mode browser (also referred to as a "site mode browser") instance is for an associated web application. The web application home button can use branding and other visual instrumentalities to convey this information. Second, the web application home button enables users to quickly and easily start back to the beginning of their web application experience by simply clicking on the web application home button to access the start URL. This alleviates having to close and re-launch a particular web application in order access the start URL for the associated website. In at least some embodiments, by default, the value associated with the start URL is ascertained from the page from which the user drags and drops the favicon on the taskbar. Alternatively, web developers can define an HTML tag that describes the start URL as part of their page. This allows them to define an alternate start URL that is not the same as the page they are currently viewing.

Figure 39:
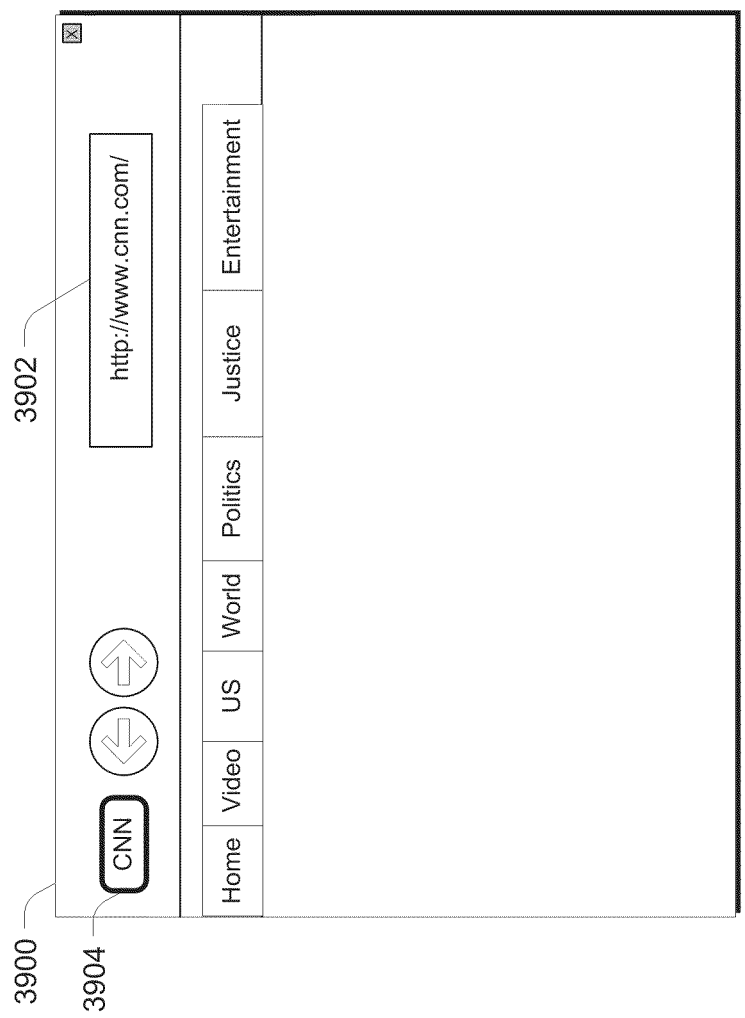
FIG. 39 illustrates a site mode browser in accordance with one or more embodiments.

As an example, consider FIG. 39. There, a web application mode browser 3900 includes an address bar 3902 in which an URL for a website appears. In addition, a web application home button 3904 appears adjacent the back and forward navigation buttons. As the user navigates to domains outside of the website associated with the web application, they can, at any time, simply click on the web application home button 3904 to navigate to the website's start URL as described in the web application file.

Further, in at least some embodiments, and in order to convey to the user their context within a web application and not a default browser, the navigational back and forward buttons can take on the identity of the website by utilizing or extracting a primary color of the site's brand through the web application home button. In addition, an HTML tag can be utilized to enable websites to specify the color of these buttons as part of their HTML page.

Figure 40:
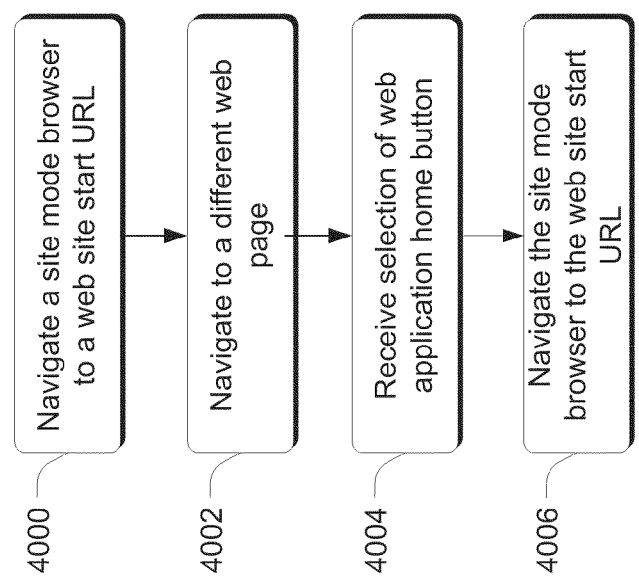
FIG. 40 is a flow diagram that describes steps in a method in accordance with one or more embodiments.

FIG. 40 is a flow diagram that describes steps a method in accordance with one or more embodiments. The method can be implemented in connection with any suitable hardware, software, firmware, or combination thereof. In at least some embodiments, the method can be implemented by a site mode browser such as that described above.

Step 4000 navigates a site mode browser to a website start URL associated with a web application that is installed on a client device. This step can be performed in any suitable way, examples of which are provided above. Step 4002 navigates to a different webpage. The webpage may or may not be associated with the website associated with the start URL. Step 4004 receives selection of a web application home button. Responsive to receiving selection of the web application home button, step 4006 navigates the site mode browser to the website start URL.

EXAMPLE SYSTEM

Figure 41:
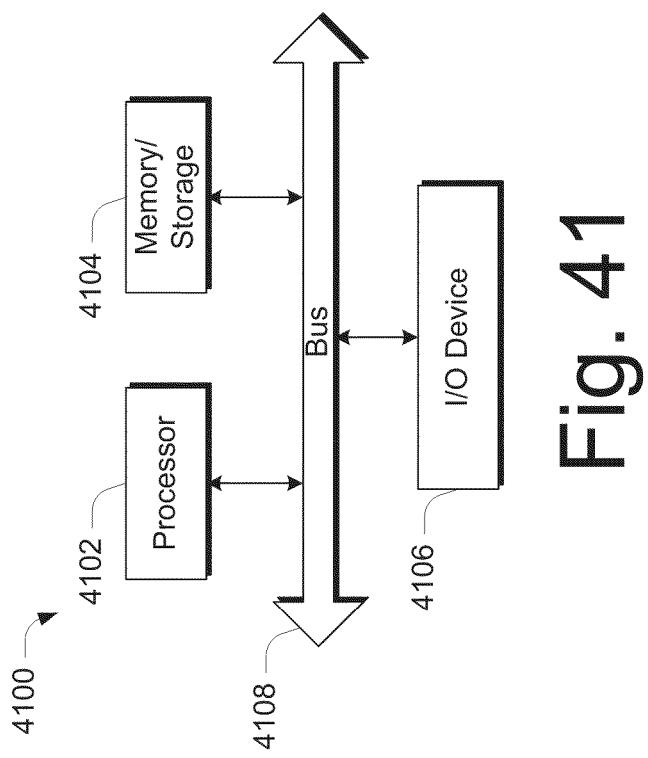
FIG. 41 illustrates an example system that can be utilized to implement one or more embodiments.

FIG. 41 illustrates an example computing device 4100 that can be used to implement the various embodiments described above. Computing device 4100 can be, for example, computing device 102 of FIG. 1 or any other suitable computing device.

Computing device 4100 includes one or more processors or processing units 4102, one or more memory and/or storage components 4104, one or more input/output (I/O) devices 4106, and a bus 4108 that allows the various components and devices to communicate with one another. Bus 4108 represents one or more of any of several types of bus structures, including a memory bus or memory controller, a peripheral bus, an accelerated graphics port, and a processor or local bus using any of a variety of bus architectures. Bus 4108 can include wired and/or wireless buses.

Memory/storage component 4104 represents one or more computer storage media. Component 4104 can include volatile media (such as random access memory (RAM)) and/or nonvolatile media (such as read only memory (ROM), Flash memory, optical disks, magnetic disks, and so forth). Component 4104 can include fixed media (e.g., RAM, ROM, a fixed hard drive, etc.) as well as removable media (e.g., a Flash memory drive, a removable hard drive, an optical disk, and so forth).

One or more input/output devices 4106 allow a user to enter commands and information to computing device 4100, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Various embodiments provide a mechanism to allow end users to install web applications and websites onto their desktop. In accordance with one or more embodiments, client-side code can be utilized to allow developers associated with a website to define boundaries associated with user interaction, and have those boundaries enforced by a run-time engine. In at least some embodiments, developers can provide, through JavaScript code, various configurations for the creation of a start menu shortcut, navigation, and so-called jumplist integration, as well as a variety of other functionality.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method comprising:
    initiating, on a client device, an installation process to install a web application associated with a website, wherein the installation process comprises creating a web application file, the web application file configured to include data associated with launching a website via a web application mode browser;
    obtaining session information of a current web session associated with the website;
    obtaining credentials related to the session information; and
    associating the credentials related to the session information with the web application.

2. The method of claim 1, wherein associating the credentials comprises generating an identification number.

3. The method of claim 2, wherein generating an identification number is based upon the session information, or login information, or both.

4. The method of claim 1, wherein obtaining credentials comprises querying a credentials store.

5. The method of claim 1, wherein obtaining session information comprises using a shared memory component between a browser rendering content associated with the website and the installation process.

6. The method of claim 1, wherein the credentials comprise a username and password.

7. One or more computer-readable hardware storage media having stored thereon instructions that, when executed, implement a method comprising:
    receiving selection of a web application to launch;
    responsive to receiving selection of the web application to launch, launching the web application via a web application mode browser, wherein the web application mode browser is configured to:
        enable navigation to domains associated with the web application within the web application mode browser; and
        instantiate a default browser for navigation to domains outside of the domains associated with the web application;
    retrieving credentials associated with the web application;
    retrieving a start Uniform Resource Locator (URL) associated with the web application; and
    autonomously logging in to an associated website using the credentials.

8. The computer-readable hardware storage media of claim 7, wherein the credentials associated with the web application comprise a username and password.

9. The computer-readable hardware storage media of claim 7, wherein the credentials associated with the web application are associated through use of an identification number based at least in part upon the credentials.

10. The computer-readable hardware storage media of claim 7, wherein retrieving credentials associated with the web application further comprises retrieving the credentials from a web application credentials store.

11. The computer-readable hardware storage media of claim 10, wherein retrieving the credentials from the web application credentials store further comprises using a reference back to a different credentials store to retrieve the credentials.

12. The computer-readable hardware storage media of claim 7, wherein receiving selection of a web application to launch further comprises receiving the selection via a tool bar or a desktop start menu.

13. One or more computer-readable hardware storage media embodying:
    a credentials store, the credentials store comprising:
        one or more data entries, wherein a data entry comprises:
            data identifying a web application that is integrated on a client device; and
            associated user credentials for a website associated with the web application; and
    software code configured to enable the web application to be launched on the client device and for the user credentials to be used automatically to log an associated user into the website responsive to the web application being launched.

14. The computer-readable hardware storage media of claim 13, wherein the associated user credentials comprise a username and password.

15. The computer-readable hardware storage media of claim 13, wherein the data identifying the web application comprises an identification number based at least in part on the associated user credentials.

16. The computer-readable hardware storage media of claim 13, wherein the associated user credentials comprise a copy of credentials from a different credential store.

17. The computer-readable hardware storage media of claim 13, wherein the data entry further comprises a Uniform Resource Locator (URL).

18. The computer-readable hardware storage media of claim 13, wherein at least a second data entry comprises:
    data identifying a second web application that is integrated on the client device; and
    associated user credentials for a website associated with the second web application, wherein the website is also associated with the first-mentioned web application.

19. The computer-readable hardware storage media of claim 18, wherein the associated user credentials for the website associated with the second web application are different user credentials than associated user credentials for the first-mentioned web application.

20. The computer-readable hardware storage media of claim 19, wherein the software code is further configured to enable the second web application to be launched and use different user credentials to automatically log a second user into the website responsive to the second web application being launched.

* * * * *